United States Patent
Onishi

(10) Patent No.: US 8,610,693 B2
(45) Date of Patent: Dec. 17, 2013

(54) OPTICAL POSITION DETECTION DEVICE, OPTICAL POSITION DETECTION SYSTEM, AND DISPLAY SYSTEM WITH INPUT FUNCTION

(75) Inventor: Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 74 days.

(21) Appl. No.: 13/437,345

(22) Filed: Apr. 2, 2012

(65) Prior Publication Data

US 2012/0249418 A1    Oct. 4, 2012

(30) Foreign Application Priority Data

Apr. 4, 2011    (JP) .................. 2011-082505

(51) Int. Cl.
G06F 3/042    (2006.01)

(52) U.S. Cl.
USPC .......................................... 345/175; 345/173

(58) Field of Classification Search
USPC ................... 345/173–178; 178/18.01–18.07, 178/19.01–19.07
See application file for complete search history.

(56) References Cited

U.S. PATENT DOCUMENTS

| 6,953,926 B2 | 10/2005 | Reime |
| 2011/0222075 A1 | 9/2011 | Takahashi |
| 2011/0279827 A1 | 11/2011 | Onishi |
| 2011/0304591 A1 | 12/2011 | Takahashi et al. |

FOREIGN PATENT DOCUMENTS

| JP | 2003-534554 | 11/2003 |
| JP | 2009-295318 | 12/2009 |
| JP | 2010-127671 | 6/2010 |
| JP | 2011-185817 | 9/2011 |
| JP | 2011-237360 | 11/2011 |
| JP | 2011-257335 | 12/2011 |

*Primary Examiner* — Ricardo L Osorio
(74) *Attorney, Agent, or Firm* — Harness, Dickey & Pierce, P.L.C.

(57) ABSTRACT

In an optical position detection device, the XY coordinates of a target object are detected based on received light intensity of a light receiving section by forming a light intensity distribution, in which the intensity changes in a radiation angle range of detection light, with first and second light source modules. The first and second light source modules are separated from each other in the Z-axis direction, and the position of the target object in the Z-axis direction is detected based on the received light intensity of the light receiving section when forming the light intensity distribution in which the intensity is fixed in the radiation angle range of detection light.

10 Claims, 18 Drawing Sheets

OPTICAL POSITION DETECTION DEVICE, OPTICAL POSITION DETECTION SYSTEM, AND DISPLAY SYSTEM WITH INPUT FUNCTION

BACKGROUND

1. Technical Field

The present invention relates to an optical position detection device which optically detects the position of a target object, an optical position detection system, and a display system with an input function.

2. Related Art

An optical position detection device has been proposed to detect a target object. In such a device, a plurality of point light source sections and a plurality of light receiving sections are provided at positions separated from each other. When detection light is emitted from each of the light source sections toward a target object through a light transmissive member, detection light reflected from the target object is transmitted through the light transmissive member and is then detected by the light receiving sections (refer to JP-T-2003-534554). The optical position detection device detects the position of the target object using a condition in which the received light intensity in a light receiving section changes according to a distance from a light source to the light receiving section via the target object.

In addition, an optical position detection device has also been proposed in which the light intensity distribution, in which the intensity changes in the in-plane direction of a light guide plate, is formed at one surface side of the light guide plate by emitting detection light, which is emitted from each of a plurality of point light source sections, through the light guide plate and detection light reflected from the target object located in a space, in which the light intensity distribution is formed, is detected by a light receiving section (refer to JP-A-2010-127671 and JP-A-2009-295318). In this optical position detection device, the light intensity changes with the position of the target object. Accordingly, the optical position detection device detects the position of the target object in the in-plane direction of the light guide plate using a condition in which the amount of light reflected from the target object changes with the position of the target object.

In the optical position detection devices disclosed in JP-T-2003-534554, JP-A-2010-127671, and JP-A-2009-295318, however, there is a problem in that the range where the position of the target object can be detected is narrow. That is, in the optical position detection device disclosed in JP-T-2003-534554, the detection light emission angle range is narrow since detection light emitted from a point light source is used. For this reason, the range where the position of the target object can be detected is narrow. In addition, in the optical position detection devices disclosed in JP-A-2010-127671 and JP-A-2009-295318, it is necessary to increase the size of the light guide plate to extend a range where the position of the target object can be detected. However, if the large light guide plate is used, large attenuation occurs when detection light propagates through the light guide plate. For this reason, since it is difficult to form a predetermined light intensity distribution with a sufficient intensity level over a wide range, the range where the position of the target object can be detected is narrow.

Moreover, to detect the three-dimensional position of the target object in the optical position detection device disclosed in JP-T-2003-534554, it is necessary to dispose a plurality of point light source sections in a three-dimensional manner. In this case, however, since the emission angle range of the detection light emitted from the light source sections is narrow, the range where the position of the target object can be detected becomes extremely narrow. In addition, to detect the three-dimensional position of the target object in the optical position detection devices disclosed in JP-A-2010-127671 and JP-A-2009-295318, it is necessary to form an intensity distribution in which the intensity changes in a direction normal to the light guide plate. It is difficult to form such an intensity distribution with a large light guide plate. Therefore, the range where the position of the target object can be detected is extremely narrow.

SUMMARY

An advantage of some aspects of the invention is to provide an optical position detection device capable of optically detecting the three-dimensional position of a target object over a wide range, an optical position detection system, and a display system with an input function.

An aspect of the invention is directed to an optical position detection device including: a first light source module that includes a first light emitting section and radially emits first detection light along a virtual plane defined by first and second directions crossing each other, the first detection light having a light intensity which changes along a circumferential direction of the first light emitting section; a second light source module that includes a second light emitting section and is provided at a position separated from the first light source module in a third direction crossing the virtual plane and that radially emits second detection light along the virtual plane, the second detection light having a light intensity which changes along a circumferential direction of the second light emitting section; a light source driving section that drives the first and second light source modules in different periods; a light receiving section that receives light from a target object located in a detection light emission space to which at least one of the first detection light and the second detection light is emitted; and a position detecting section that detects position information of the target object in the first, second, and third directions on the basis of received light intensity of the light receiving section.

In the optical position detection device according to this aspect of the invention, the first and second light source modules emit detection light along the virtual plane specified by the first and second directions, and the light receiving section receives detection light from a light source section after it is reflected from the target object located in the detection light emission space (space to be detected). Therefore, the position detecting section can detect the position of the target object in the first and second directions on the basis of the received light intensity in the light receiving section. In this case, since the detection light is radially emitted, it is possible to emit the detection light over a wide range. Accordingly, the detectable space in the first and second directions is wide. Moreover, in the optical position detection device according to this aspect of the invention, the first and second light source modules emit detection light from positions separated in the third direction. Accordingly, the position detecting section can detect the position of the target object in the third direction on the basis of the received light intensity in the light receiving section. Also in this case, since the detection light is emitted radially, it is possible to emit the detection light with sufficient intensity to the entire space to be detected. Therefore, according to this aspect of the invention, the position of the target object in the third direction can also be detected in the space to be detected which is wide in the first and second directions.

In the optical position detection device according to the aspect of the invention, it is preferable that an emission angle range of the first detection light in the third direction be narrower than an emission angle range of the second detection light in the third direction. According to this configuration, even when the distance between the first and second light source modules in the third direction is small, an overlapping portion of the first detection light and the second detection light in the third direction can be made narrow. Therefore, even when the distance between the first and second light source modules in the third direction is small, the position of the target object in the third direction can be reliably detected.

In the optical position detection device according to the aspect of the invention, the first light source module may include a light emitting element that emits the first detection light, a first light guide that guides the first detection light so that the first detection light is emitted toward the detection light emission space, and an emission angle range limiting member provided on a light emitting surface of the first light guide to limit an emission angle range of the first detection light in the third direction. The second light source module may include a light emitting element that emits the second detection light and a second light guide that guides the second detection light so that the second detection light is emitted toward the detection light emission space. According to this configuration, the detection light (first detection light and second detection light) emitted from the light emitting elements (the light emitting element that emits the first detection light and the light emitting element that emits the second detection light) is emitted through the light guides (first and second light guides). Therefore, it is possible to form a light intensity distribution in which the light intensity continuously changes.

In the optical position detection device according to the aspect of the invention, preferably, the emission angle range limiting member is a louver film and a louver portion of the louver film is inclined toward a side opposite to a side at which the second light source module is located in the third direction from a light incidence surface toward a light emitting surface of the louver film. According to this configuration, the amount of overlap between the first detection light and the second detection light can be reduced.

In this case, the first light source module may include, as the light emitting element for emission of first detection light, a first light emitting element which makes the first detection light incident on the first light guide from one end of the first light guide, and a second light emitting element which makes the first detection light incident on the first light guide from the other end of the first light guide. The second light source module may include, as the light emitting element for emission of second detection light, a third light emitting element which makes the second detection light incident on the second light guide from one end of the second light guide, and a fourth light emitting element which makes the second detection light incident on the second light guide from the other end of the second light guide. The light source driving section may operate in a first period during which the first light emitting element is turned on, a second period during which the fourth light emitting element is turned on, a third period during which the first and second light emitting elements are turned on, and a fourth period during which the third and fourth light emitting elements are turned on. According to this configuration, the position of the target object in the first, second, and third directions can be detected with a small number of light emitting elements.

In the optical position detection device according to the aspect of the invention, the first light source module may include a plurality of light emitting elements for emission of first detection light that are arranged in an array in a circumferential direction of the first light source module. The second light source module may include a plurality of light emitting elements for emission of second detection light that are arranged in an array in a circumferential direction of the second light source module. The light source driving section may operate in a first period during which the plurality of light emitting elements for emission of first detection light are turned on in a condition in which an emission intensity decreases from the one end toward the other end, a second period during which the plurality of light emitting elements for emission of second detection light are turned on in a condition in which an emission intensity decreases from the other end toward the one end, a third period during which the light emitting elements for emission of first detection light are operated with the same emission intensity, and a fourth period during which the light emitting elements for emission of second detection light are operated with the same emission intensity. According to this configuration, it is possible to emit detection light (first detection light and second detection light) from the first and second light source modules to positions far apart in the first and second directions. Therefore, the detectable space in the first and second directions can be made wider.

In the optical position detection device according to the aspect of the invention, preferably, the position detecting section detects a position of the target object in the first and second directions on the basis of a comparison result of a received light intensity in the first period and a received light intensity in the second period in the light receiving section, and detects the position of the target object in the third direction on the basis of a comparison result of the received light intensity in the third period and the received light intensity in the fourth period in the light receiving section. According to this configuration, the influence of ambient light, such as outside light, and the like can be eliminated.

Another aspect of the invention is directed to an optical position detection system including the optical position detection device described above. In this optical position detection system, a viewing surface forming member having a viewing surface extending along the virtual plane is disposed at a side of the first light source module with respect to the detection light emission space in the third direction.

The optical position detection device according to the aspect of the invention can be used in various kinds of systems, such as a display system with an input function. For example, in a display system with an input function that includes a display device with a display surface on which an image is displayed and an optical position detection device, which detects a position of a target object located at a surface side of the display device on which the image is displayed, and that switches the image on the basis of a position detection result of the target object in the optical position detection device, the optical position detection device according to the aspect of the invention can be used as the optical position detection device. In addition, in a display system with an input function that includes an image projection apparatus that projects an image and an optical position detection device, which optically detects a position of a target object located at a side of the image projection apparatus toward which the image is projected, and that switches the image on the basis of a position detection result of the target object in the optical position detection device, the optical position detection device according to the aspect of the invention can be used as the optical position detection device. In addition, the optical position detection device according to the aspect of the invention may also be used in other systems, such as an input system of electronic paper, a window system with an input function, and an amusement system with an input function.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
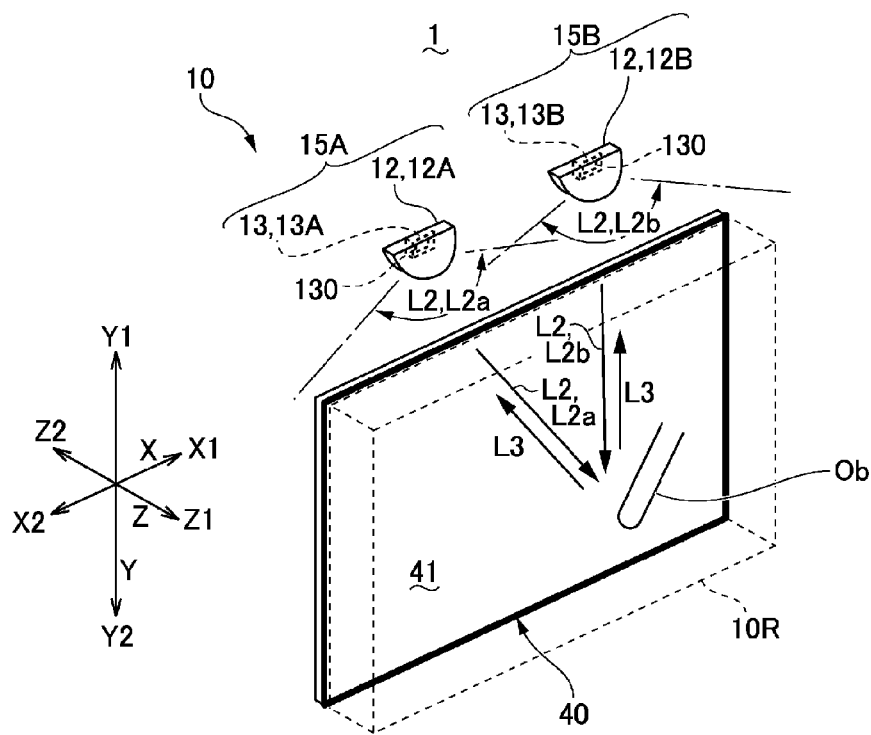
FIGS. 1A and 1B are explanatory views schematically showing sections of an optical position detection device according to a first embodiment of the invention.

Next, embodiments of the invention will be described with reference to the accompanying drawings. In the following explanation, it is assumed that directions crossing each other are the X-axis direction and the Y-axis direction and a direction crossing the X-axis direction and the Y-axis direction is the Z-axis direction. Therefore, a "first direction" in the embodiments of the invention is equivalent to the X-axis direction, a "second direction" in the embodiments of the invention is equivalent to the Y-axis direction, and a "third direction" in the embodiments of the invention is equivalent to the Z-axis direction. In addition, "first detection light for first and second direction position detection" in the embodiments of the invention is equivalent to first detection light for XY coordinate detection L2e, and "second detection light for first and second direction position detection" in the embodiments of the invention is equivalent to second detection light for XY coordinate detection L2f. In addition, "first detection light for third direction position detection" in the embodiments of the invention is equivalent to first detection light for Z-axis direction position detection L2g, and "second detection light for third direction position detection" in the embodiments of the invention is equivalent to second detection light for Z-axis direction position detection L2h. Moreover, in the drawings referred to below, the opposite sides of the X-axis direction are respectively expressed as X1 and X2 sides, the opposite sides of the Y-axis direction are respectively expressed as Y1 and Y2 sides, and the opposite sides of the Z-axis direction are respectively expressed as Z1 and Z2 sides.

First Embodiment

Overall Configuration

Figure 1B:
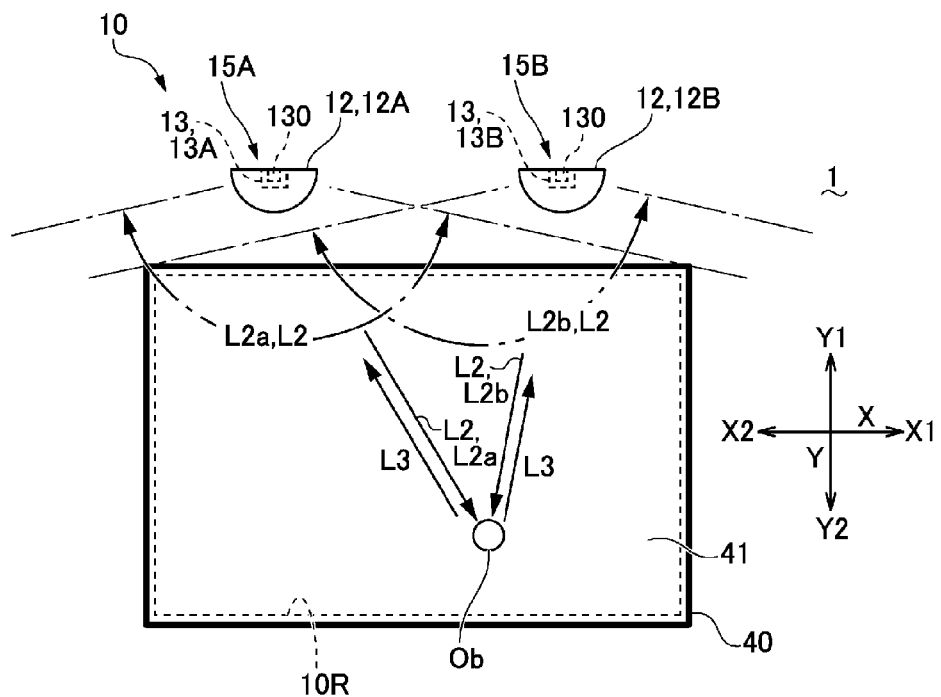

FIGS. 1A and 1B are explanatory views schematically showing sections of an optical position detection device according to a first embodiment of the invention. FIG. 1A is an explanatory view when the optical position detection device is viewed from the oblique direction at the side of a detection light emission space, and FIG. 1B is an explanatory view when the optical position detection device is viewed from the front.

In FIGS. 1A and 1B, a position detection system 1 according to the present embodiment includes an optical position detection device 10 which detects the position of a target object Ob. The optical position detection device 10 detects the position of the target object Ob using detection light L2 which is radially emitted along the virtual XY plane (virtual plane) defined by the X-axis direction and the Y-axis direction. In the present embodiment, the position detection system 1 includes a viewing surface forming member 40 having a viewing surface 41 extending along the XY plane at the one side Z1 of the Z-axis direction. The optical position detection device 10 emits the detection light L2 along the viewing surface 41, and detects the position of the target object Ob located at the viewing surface 41 side (one side Z1 of the Z-axis direction)

of the viewing surface forming member 40. Accordingly, a space to be detected 10R of the position detection system 1 is a detection light emission space where the detection light L2 is emitted in the optical position detection device 10. The light intensity distribution of the detection light L2, which will be described later, is formed in the space to be detected 10R. With the optical position detection device 10, the position detection system 1 may be used as a display system with an input function such as an electronic blackboard, a projection type display system with an input function, and the like, which will be described later.

In the position detection system 1 according to the present embodiment, the optical position detection device 10 includes a light source section 12 (linear light source section), which radially emits the detection light L2 along the viewing surface 41 (XY plane), and a light receiving section 13, which receives the detection light L2 (reflected light L3) reflected from the target object Ob located in the emission space (space to be detected 10R) of the detection light L2.

In the present embodiment, two light source sections 12 (first and second light source sections 12A and 12B) which face the space to be detected 10R at positions separated from the viewing surface forming member 40 at the one side Y1 of the Y-axis direction are used as the light source section 12. The first and second light source sections 12A and 12B are separated from each other in the X-axis direction and are at the same position in the Y-axis direction. Moreover, in the present embodiment, first and second light receiving sections 13A and 13B which face the space to be detected 10R at positions separated from the viewing surface forming member 40 at the one side Y1 of the Y-axis direction are used as the light receiving section 13. The first and second light receiving sections 13A and 13B are separated from each other in the X-axis direction and are at the same position in the Y-axis direction.

Here, the first light receiving section 13A is disposed at the radiation center of the detection light L2 (detection light L2*a*) emitted radially from the first light source section 12A, and the first light receiving section 13A and the first light source section 12A are unified as a first light emission and reception unit 15A. In addition, the second light receiving section 13B is disposed at the radiation center of the detection light L2 (detection light L2*b*) emitted radially from the second light source section 12B, and the second light receiving section 13B and the second light source section 12B are unified as a second light emission and reception unit 15B.

As will be described later, each of the two light source sections 12 (first and second light source sections 12A and 12B) includes a light emitting element (point light source), such as an LED (light emitting diode). The light emitting element emits the detection light L2 of infrared light, which has a peak wavelength of 840 to 1000 nm, as diverging light. Each light receiving section 13 (each of the first and second light receiving sections 13A and 13B) includes a light receiving element 130, such as a photodiode or a phototransistor. In the present embodiment, the light receiving element 130 is a photodiode with a sensitivity peak in the infrared region.

The first and second light emission and reception units 15A and 15B are located at positions shifted toward the one side Z1 of the Z-axis direction from the viewing surface forming member 40. In addition, the first and second light emission and reception units 15A and 15B operate in different periods. Therefore, when the detection light L2*a* is emitted from the first light source section 12A in the first light emission and reception unit 15A, the first light receiving section 13A receives the detection light L2*a* (reflected light L3) reflected from the target object Ob located in the space to be detected 10R. In a different period from this operation, when the detection light L2*b* is emitted from the second light source section 12B in the second light emission and reception unit 15B, the second light receiving section 13B receives the detection light L2*b* (reflected light L3) reflected from the target object Ob located in the space to be detected 10R.

Specific Configuration of the Light Source Section 12

Figure 2:
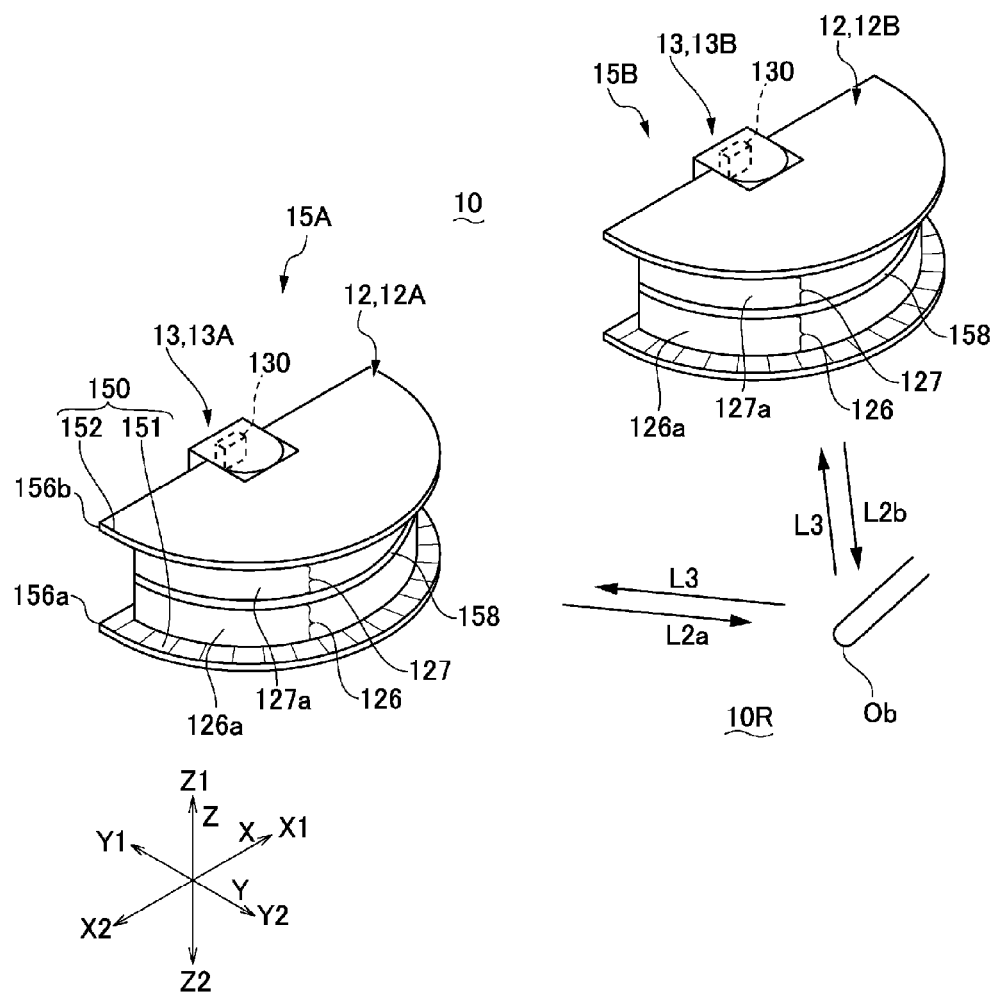
FIG. 2 is an explanatory view of a light emission and reception unit of the optical position detection device according to the first embodiment of the invention.
Figure 3:
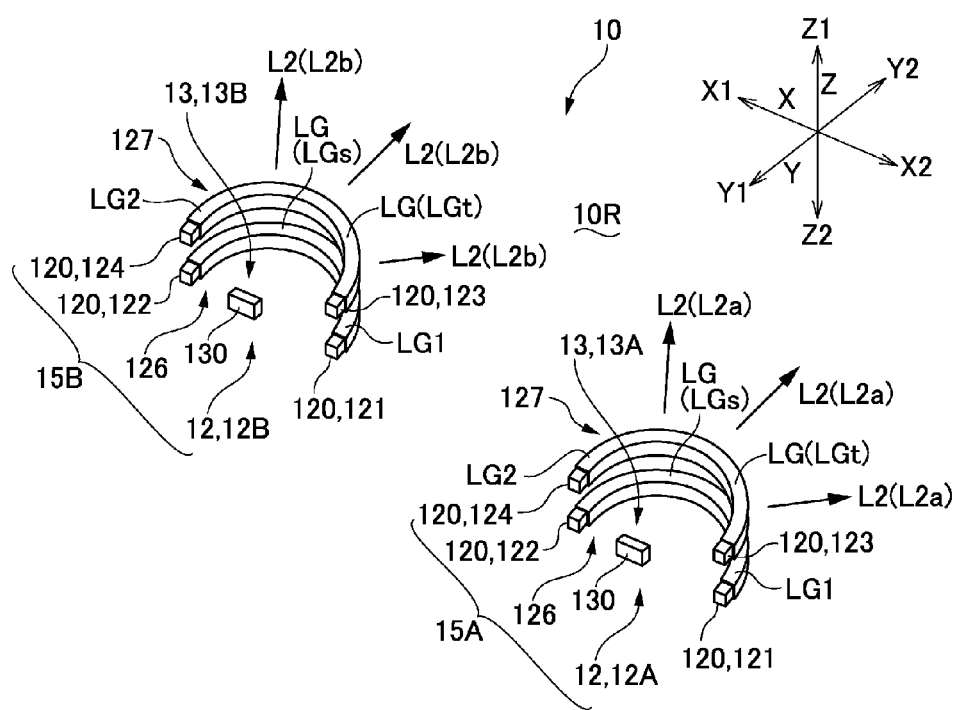
FIG. 3 is an explanatory view showing the configuration of sections of the light emission and reception unit shown in FIG. 2.
Figure 4A:
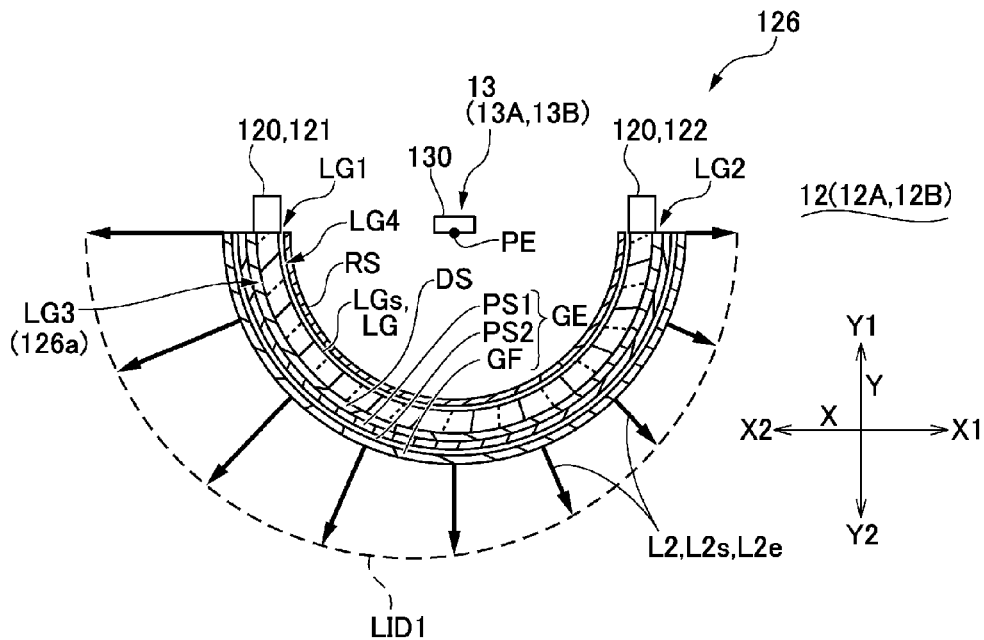
FIGS. 4A and 4B are explanatory views schematically showing the configuration of a light source section provided in the light emission and reception unit shown in FIG. 3.
Figure 4B:
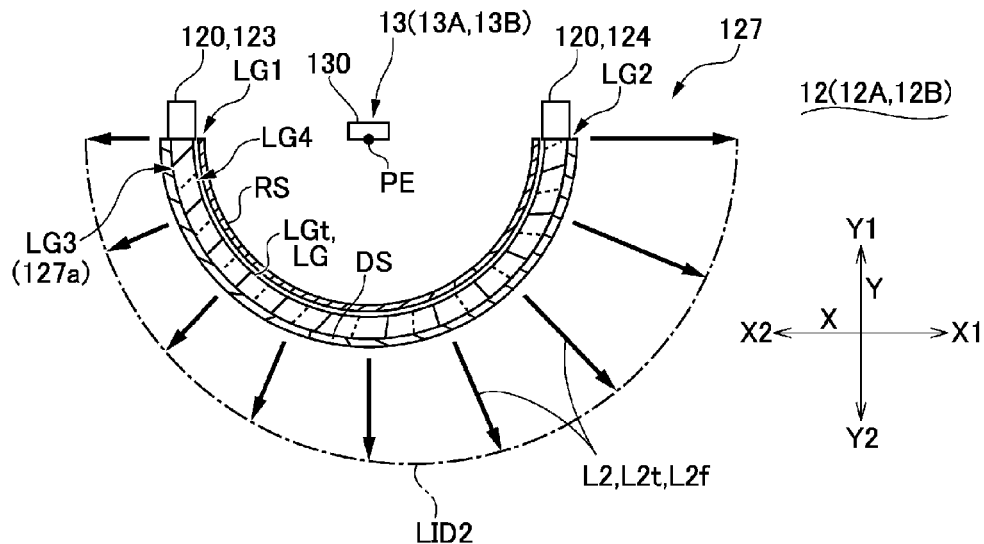
Figure 5A:
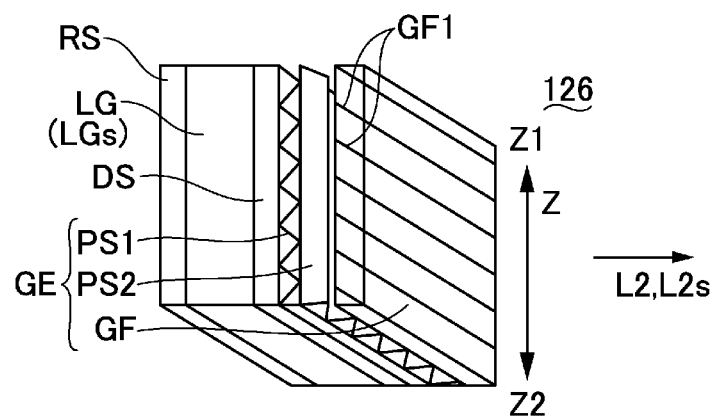
FIGS. 5A and 5B are explanatory views of an optical member provided in the light emission and reception unit shown in FIG. 3.
Figure 5B:
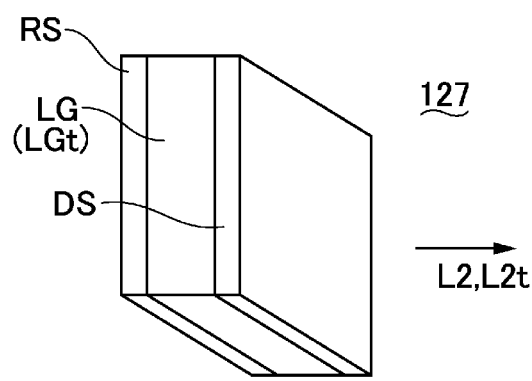

FIG. 2 is an explanatory view of a light emission and reception unit of the optical position detection device 10 according to the first embodiment of the invention. FIG. 3 is an explanatory view showing the configuration of sections of the light emission and reception unit shown in FIG. 2. FIGS. 4A and 4B are explanatory views schematically showing the configuration of the light source section 12 provided in the light emission and reception unit shown in FIG. 3. FIG. 4A is an explanatory view showing a state where the detection light L2 (first detection light for XY coordinate detection L2*e*) is emitted at the time of a first lighting operation in a first period, and FIG. 4B is an explanatory view showing a state where the detection light L2 (second detection light for XY coordinate detection L2*f*) is emitted at the time of a second lighting operation in a second period. FIGS. 5A and 5B are explanatory views of an optical member provided in the light emission and reception unit shown in FIG. 3. FIG. 5A is an explanatory view of an optical member provided in a first light source module, and FIG. 5B is an explanatory view of an optical member provided in a second light source module.

As shown in FIG. 2, in the optical position detection device 10 according to the present embodiment, the first and second light emission and reception units 15A and 15B have the same configuration. Accordingly, the first and second light source sections 12A and 12B also have the same configuration. More specifically, the first light emission and reception unit 15A has a light source support member 150 with a fan shape or a semicircular shape when viewed from the Z-axis direction. This light source support member 150 has a structure in which first and second light source support members 151 and 152 overlap each other in the Z-axis direction. The first and second light source support members 151 and 152 have fan-shaped or semicircular flanges 156*a* and 156*b*, respectively. A portion interposed between the flanges 156*a* and 156*b* is a light emitting section which emits the detection light L2 from the first light source section 12A, and the flanges 156*a* and 156*b* restrict the emission range of the detection light L2 in the Z-axis direction.

In the first light emission and reception unit 15A, the first light source section 12A includes first and second light source modules 126 and 127, which are disposed so as to overlap each other in the Z-axis direction, as a light emitting section of the detection light L2. The first light source module 126 is disposed at the position separated from the second light source module 127 by a predetermined distance toward the other side Z2 (side at which the viewing surface forming member 40 shown in FIGS. 1A and 1B is located) of the Z-axis direction. In the first light source section 12A, a portion interposed between the first and second light source modules 126 and 127 in the Z-axis direction is a transmissive light guide section 158, and the light receiving element 130 of the first light receiving section 13A is disposed at the back of the light guide section 158.

As shown in FIGS. 3, 4A, and 4B, each of the first and second light source modules 126 and 127 includes a light emitting element 120, such as a light emitting diode, and an arc-shaped light guide LG. More specifically, as shown in FIG. 3 and FIG. 4A, the first light source module 126 includes two light emitting elements 120 (first and second light emitting elements 121 and 122/light emitting element for first detection light emission), such as a light emitting diode which emits infrared light, and also includes the arc-shaped light guide LG (first light guide LGs). The first light emitting element 121 of the two light emitting elements 120 is disposed at one end LG1 of the light guide LG, and the second light emitting element 122 is disposed at the other end LG2 of the light guide LG.

In addition, as shown in FIGS. 4A and 5A, the first light source module 126 includes a diffusion sheet DS and an optical member for limiting the emission angle range GE, such as a first prism sheet PS1, a second prism sheet PS2, and a louver film GF, along the arc-shaped outer peripheral surface LG3 of the light guide LG, and also includes an arc-shaped reflection sheet RS along the arc-shaped inner peripheral surface LG4 of the light guide LG. A louver portion GF1 of the louver film GF is inclined toward an opposite side to a side at which the second light source module 127 is located in the Z-axis direction from the light incidence surface of the louver film GF toward the light emitting surface.

In the first light source module 126, a first light emitting section 126a is formed by the arc-shaped outer peripheral surface LG3 of the light guide LG, and the first light source module 126 emits first detection light L2s as the detection light L2 in the circumferential direction of the first light emitting section 126a.

Similar to the first light source module 126, the second light source module 127 includes two light emitting elements 120 (third and fourth light emitting elements 123 and 124/light emitting element for emission of second detection light), such as a light emitting diode which emits infrared light, and also includes the arc-shaped light guide LG (second light guide LGt), as shown in FIG. 3 and FIG. 4B. The third light emitting element 123 of the two light emitting elements 120 is disposed at one end LG1 of the light guide LG, and the fourth light emitting element 124 is disposed at the other end LG2 of the light guide LG.

Moreover, similar to the first light source module 126, the second light source module 127 includes the diffusion sheet DS along the arc-shaped outer peripheral surface LG3 of the light guide LG and also includes the arc-shaped reflection sheet RS along the inner peripheral surface LG4, as shown in FIGS. 4B and 5B. However, unlike the first light source module 126, the second light source module 127 does not include the optical member for limiting the emission angle range GE, such as the first prism sheet PS1, the second prism sheet PS2, and the louver film GF.

In the second light source module 127, a second light emitting section 127a is formed by the arc-shaped outer peripheral surface LG3 of the light guide LG, and the second light source module 127 emits second detection light L2t as the detection light L2 in the circumferential direction of the second light emitting section 127a.

Comparing the first light source module 126 with the second light source module 127, the emission angle range in the Z-axis direction of the first detection light L2s from the first light source module 126 is narrower than the emission angle range in the Z-axis direction of the second detection light L2t from the second light source module 127 since the optical member for limiting the emission angle range GE, which narrows the emission angle range of the detection light L2 in the Z-axis direction, is disposed in the first light source module 126. In particular, in the present embodiment, the louver portion GF1 of the louver film GF is inclined toward the opposite side to the side at which the second light source module 127 is located in the Z-axis direction from the light incidence surface of the louver film GF toward the light emitting surface. Accordingly, the amount of overlap between the first detection light L2s and the second detection light L2t is small.

In addition, machining for adjusting the emission efficiency of the detection light L2 from the light guide LG may be performed on at least one of the outer peripheral surface LG3 and the inner peripheral surface LG4 of the light guide LG. As the machining method, it is possible to adopt a method of printing a reflection dot, a molding method of forming the irregularities using a stamper or by injection, or a groove machining method, for example. Since the second light emission and reception unit 15B also has the same configuration as the first light emission and reception unit 15A, an explanation thereof will be omitted.

Configuration of a Position Detecting Section and the Like

Figure 6A:
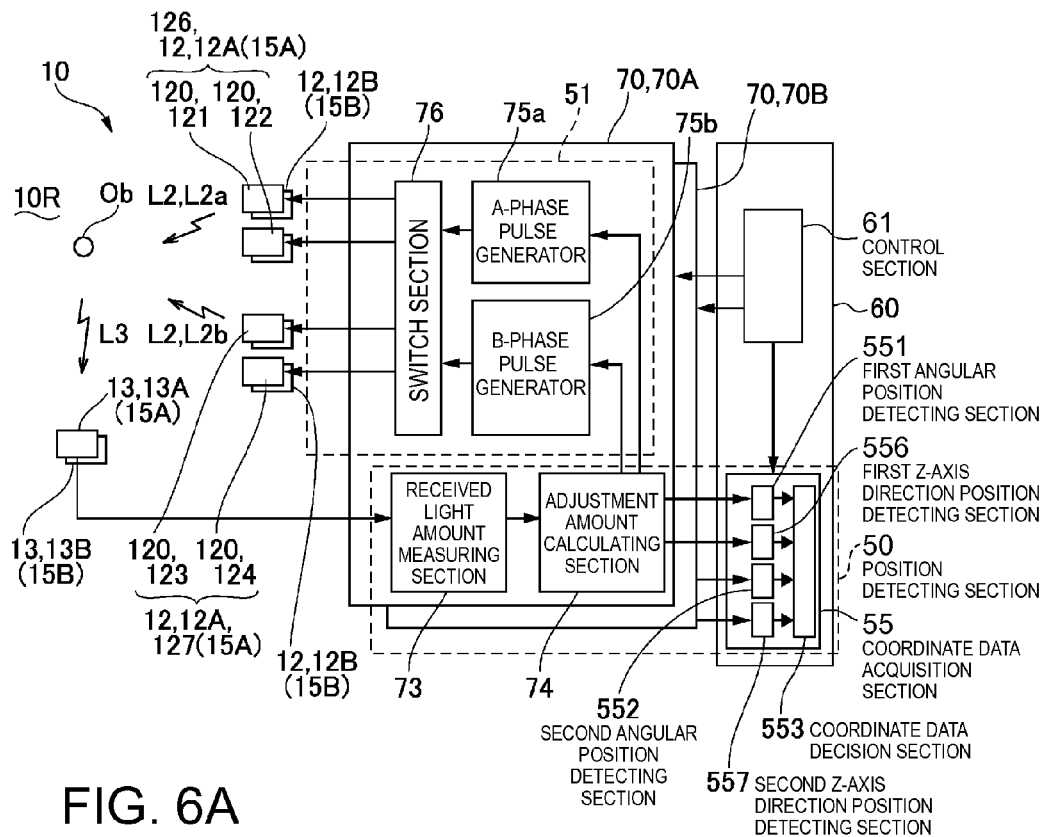
FIGS. 6A and 6B are explanatory views showing the electrical configuration of the optical position detection device according to the first embodiment of the invention.
Figure 6B:
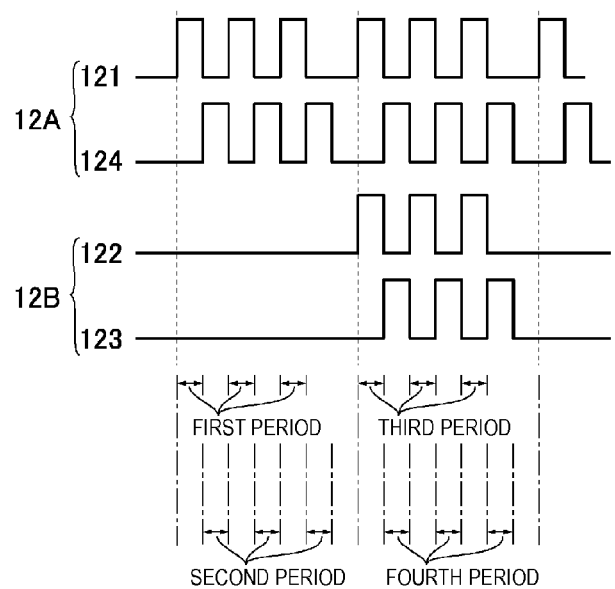

FIGS. 6A and 6B are explanatory views showing the electrical configuration of the optical position detection device 10 according to the first embodiment of the invention. FIG. 6A is an explanatory view showing the configuration of a control IC, and FIG. 6B is an explanatory view of a driving signal supplied to a light source.

In the optical position detection device 10 used in the position detection system 1 according to the present embodiment, the first and second light emission and reception units 15A and 15B described with reference to FIGS. 1A to 5B are electrically connected to a control IC 70 shown in FIG. 6A. Here, the control IC 70 includes a first control IC 70A electrically connected to the first light emission and reception unit 15A and a second control IC 70B electrically connected to the second light emission and reception unit 15B, and the first light source section 12A and the first light receiving section 13A of the first light emission and reception unit 15A are electrically connected to the first control IC 70A. In addition, the second light source section 12B and the second light receiving section 13B of the second light emission and reception unit 15B are electrically connected to the second control IC 70B.

The first and second control ICs 70A and 70B have the same configuration, and both the first and second control ICs 70A and 70B are electrically connected to a common control device 60. First, the first control IC 70A includes a plurality of circuits (not shown) which generate a reference clock, an A-phase reference pulse, a B-phase reference pulse, a timing control pulse, a synchronous clock, and the like. In addition, the first control IC 70A includes a pulse generator 75a which generates a predetermined driving pulse on the basis of the A-phase reference pulse, a pulse generator 75b which generates a predetermined driving pulse on the basis of the B-phase reference pulse, and a switch section 76 which controls which of the four light emitting elements 120 of the first light source section 12A receives the driving pulses generated by the pulse generators 75a and 75b are to be applied. The pulse generators 75a and 75b and the switch section 76 form a light source driving unit 51.

In addition, the first control IC 70A includes a received light amount measuring section 73, which includes an amplifier that amplifies a detection result of the first light receiving section 13A, and an adjustment amount calculating section 74, which adjusts the driving current value of a driving pulse supplied to the four light emitting elements 120 of the first light source section 12A by controlling the pulse generators 75a and 75b on the basis of a measurement result of the received light amount measuring section 73. The received light amount measuring section 73 and the adjustment amount calculating section 74 have some functions of the position detecting section 50. In addition, the adjustment amount calculating section 74 includes an analog-to-digital conversion section which outputs control signals for the pulse generators 75a and 75b.

Similar to the first control IC 70A, the second control IC 70B includes a received light amount measuring section 73 which includes an amplifier that amplifies a detection result of the second light receiving section 13B, an adjustment amount calculating section 74 which adjusts the value of a driving current supplied to the four light emitting elements 120 of the second light source section 12B by controlling the pulse generators 75a and 75b on the basis of a measurement result of the received light amount measuring section 73, and the like. The received light amount measuring section 73 and the adjustment amount calculating section 74 have some functions of the position detecting section 50.

The first and second control ICs 70A and 70B are controlled by a control section 61 of the high-order control device 60, such as a personal computer. The control device 60 has a coordinate data acquisition section 55 which forms the position detecting section 50 together with the received light amount measuring section 73 and the adjustment amount calculating section 74. In the present embodiment, therefore, the position detecting section 50 is formed by the received light amount measuring section 73 and the adjustment amount calculating section 74 of the control IC 70 (first and second control ICs 70A and 70B) and the coordinate data acquisition section 55 of the high-order control device 60 (personal computer). In addition, in the optical position detection device 10, voltage modulation or pulse width modulation is performed when controlling the driving current value for the light source section 12.

In the present embodiment, the first and second light source sections 12A and 12B disposed at separate positions are provided as the light source section 12. Accordingly, the coordinate data acquisition section 55 includes a first angular position detecting section 551, which detects the angular position (positions in the X-axis direction and the Y-axis direction) of the target object Ob with respect to the radiation center of the first light source section 12A on the basis of a driving result of the first light source section 12A, and a second angular position detecting section 552, which detects the angular position (positions in the X-axis direction and the Y-axis direction) of the target object Ob with respect to the radiation center of the second light source section 12B on the basis of a driving result of the second light source section 12B. In addition, the coordinate data acquisition section 55 includes a coordinate data decision section 553 which determines the XY coordinate data of the target object Ob on the basis of the angular position of the target object Ob obtained by the first angular position detecting section 551 and the angular position of the target object Ob obtained by the second angular position detecting section 552.

In addition, the coordinate data acquisition section 55 includes a first Z-axis direction position detecting section 556, which detects the position of the target object Ob in the Z-axis direction on the basis of a driving result of the first light source section 12A, and a second Z-axis direction position detecting section 557, which detects the position of the target object Ob in the Z-axis direction on the basis of a driving result of the second light source section 12B. Accordingly, the coordinate data decision section 553 determines the position of the target object Ob in the XYZ axis directions of the target object Ob on the basis of the angular position of the target object Ob obtained by the first angular position detecting section 551, the angular position of the target object Ob obtained by the second angular position detecting section 552, the position of the target object Ob in the Z-axis direction obtained by the first Z-axis direction position detecting section 556, and the position of the target object Ob in the Z-axis direction obtained by the second Z-axis direction position detecting section 557.

In addition, although the two control ICs 70 (first and second control ICs 70A and 70B) are used in one-to-one correspondence for the first and second light emission and reception units 15A and 15B in the present embodiment, the control IC 70 may have multiple channels so that the first and second light emission and reception units 15A and 15B are driven by one control IC 70.

Explanation Regarding a Lighting Operation and Light Intensity Distribution

Figure 7A:
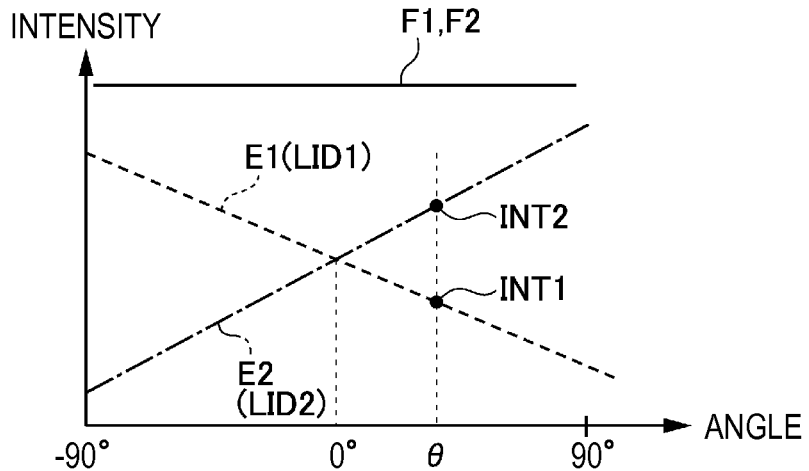
FIGS. 7A and 7B are explanatory views of the light intensity distribution when a light emitting element is turned on in the optical position detection device according to the first embodiment of the invention.
Figure 7B:
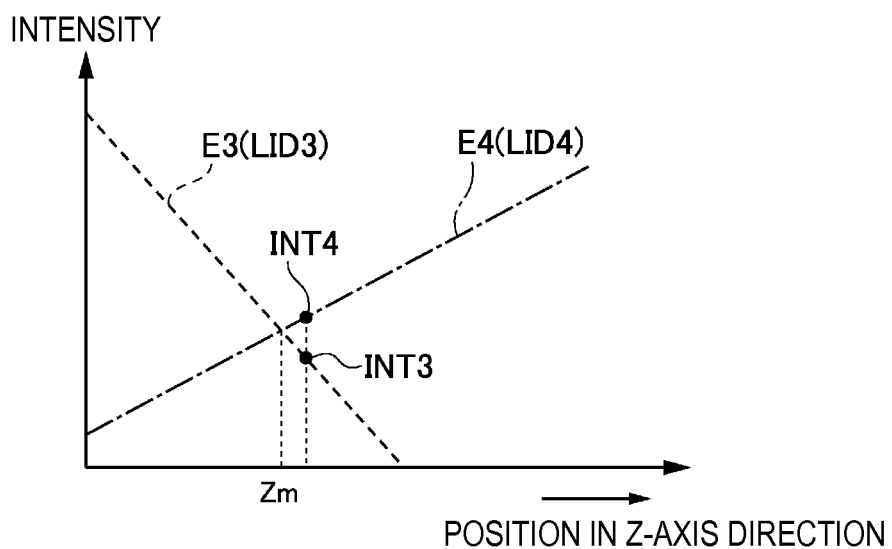
Figure 8A:
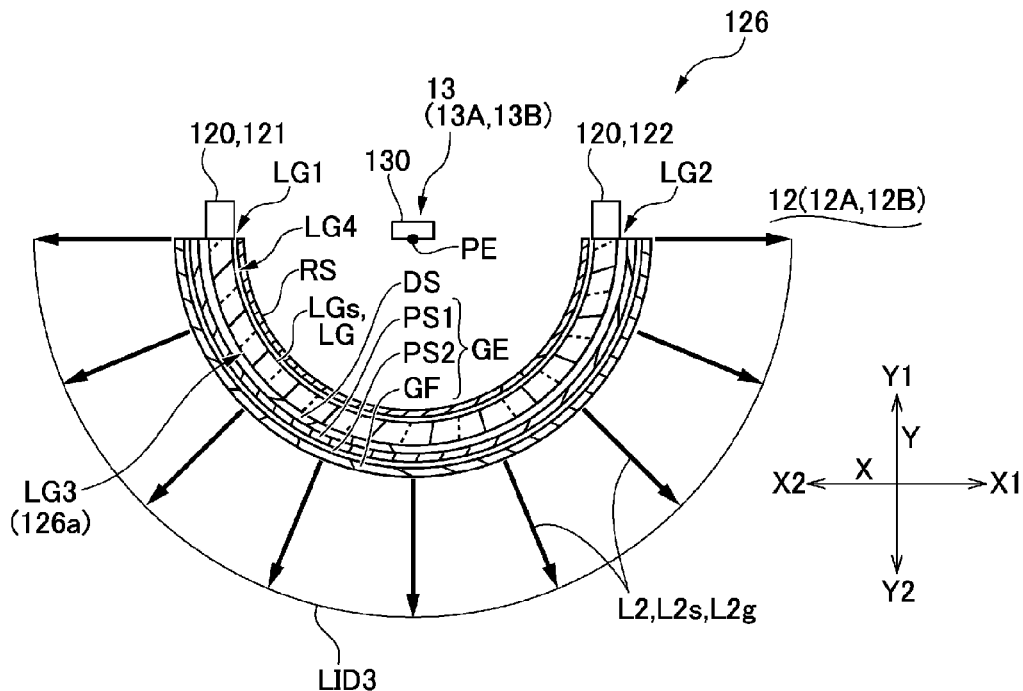
FIGS. 8A and 8B are explanatory views showing a state where detection light for Z-axis direction position detection is emitted from the light emission and reception unit shown in FIG. 3.
Figure 8B:
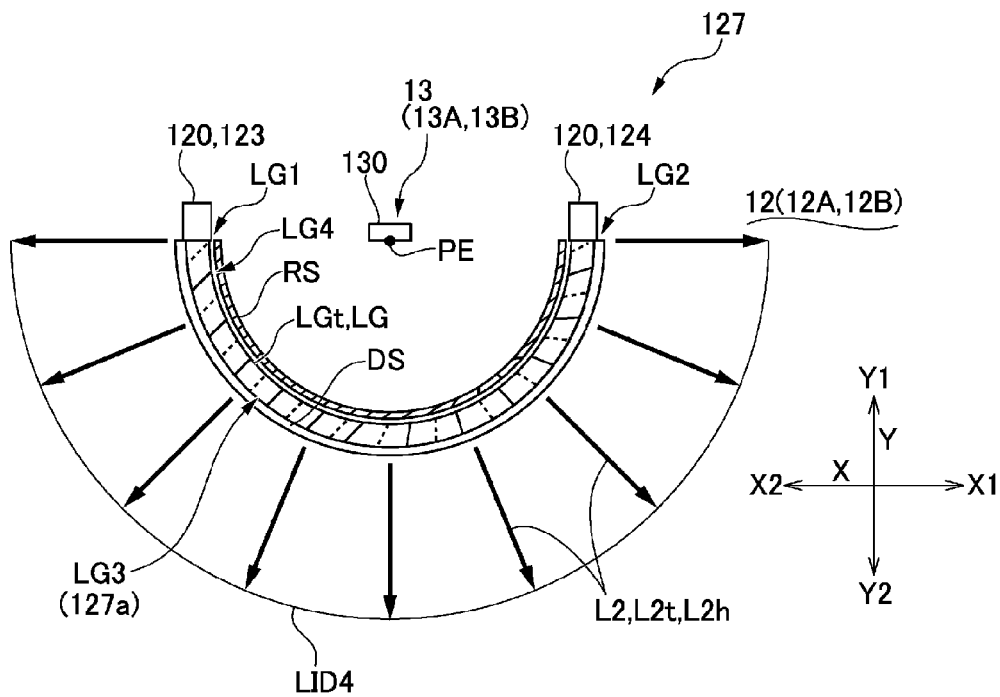

FIGS. 7A and 7B are explanatory views of the light intensity distribution formed when the light emitting element 120 is turned on in the optical position detection device 10 according to the first embodiment of the invention. FIG. 7A is an explanatory view of the light intensity distribution used for detecting the position (angular direction) of the target object Ob within the XY plane, and FIG. 7B is an explanatory view of the light intensity distribution used for detecting the Z-axis position of the target object Ob. FIGS. 8A and 8B are explanatory views showing a state where detection light for Z-axis direction position detection is emitted from the light emission and reception unit shown in FIG. 3. FIG. 8A is an explanatory view showing a state where detection light L2 (first detection light for Z-axis direction position detection L2g) is emitted in a third period, and FIG. 8B is an explanatory view showing a state where detection light L2 (second detection light for Z-axis direction position detection L2h) is emitted in a fourth period.

In the optical position detection device 10 according to the present embodiment, when detecting the position (angular direction) of the target object Ob within the XY plane, the light source driving unit 51 shown in FIG. 6A applies a driving pulse to the first light emitting element 121 of the first light source section 12A in the first period (at the time of first lighting operation) and applies a driving pulse, which has an opposite phase to the driving pulse applied to the first light emitting element 121, to the fourth light emitting element 124 of the first light source section 12A in the second period (at the time of second lighting operation), as shown in FIG. 6B. In the first period, the first light emitting element 121 is turned on and the other light emitting elements are in the OFF state. Therefore, as shown in FIG. 4A, the first detection light L2e (first detection light for XY coordinate detection L2e) is emitted from the first light source module 126 of the first light source section 12A, and a first light intensity distribution LID1 is formed in the space to be detected 10R. As shown by arrows in FIG. 4A and a dotted line E1 in FIG. 7A which indicate the light intensity, the first light intensity distribution LID1 is an intensity distribution in which the intensity decreases monotonically from the angular direction corresponding to the one end LG1 of the light guide LG toward the angular direction corresponding to the other end LG2 in the radiation angle range of the first detection light L2s.

Moreover, in the second period, the fourth light emitting element 124 is turned on and the other light emitting elements are in the OFF state. Therefore, as shown in FIG. 4B, the second detection light L2t (second detection light for XY coordinate detection L2f) is emitted from the second light source module 127 of the first light source section 12A, and a second light intensity distribution LID2 is formed in the space to be detected 10R. As shown by arrows in FIG. 4B and a dot-dash line E2 in FIG. 7A which indicate the light intensity, the second light intensity distribution LID2 is an intensity distribution in which the intensity decreases monotonically from the angular direction corresponding to the other end LG2 of the light guide LG toward the angular direction corresponding to the one end LG1 in the radiation angle range of the second detection light L2t.

Moreover, in the optical position detection device 10 according to the present embodiment, when detecting the position of the target object Ob in the Z-axis direction, the light source driving unit 51 shown in FIG. 6A applies a driving pulse to the first and second light emitting elements 121 and 122 of the first light source module 126 in the third period (at the time of third lighting operation) and applies a driving pulse, which has an opposite phase to the driving pulse applied to the first and second light emitting elements 121 and 122, to the third and fourth light emitting elements 123 and 124 of the second light source module 127 in the fourth period (at the time of fourth lighting operation), as shown in FIG. 6B. In the third period, the first and second light emitting elements 121 and 122 are turned on and the other light emitting elements are in the OFF state. Therefore, as shown in FIG. 8A, the first detection light L2s (first detection light for Z-axis direction position detection L2g) is emitted from the first light source module 126 of the first light source section 12A, and a third light intensity distribution LID3 is formed in the space to be detected 10R. As shown by arrows in FIG. 8A and a solid line F1 in FIG. 7A which indicate the light intensity, in the third light intensity distribution LID3, the intensity from the angular direction corresponding to the one end LG1 of the light guide LG to the angular direction corresponding to the other end LG2 is fixed in the radiation angle range of the first detection light L2s. However, as schematically shown in FIG. 7B, the light intensity in the Z-axis direction changes in the third light intensity distribution LID3.

Moreover, in the fourth period, the third and fourth light emitting elements 123 and 124 are turned on and the other light emitting elements are in the OFF state. Therefore, as shown in FIG. 8B, the second detection light L2t (second detection light for Z-axis direction position detection L2h) is emitted from the second light source module 127 of the first light source section 12A, and a fourth light intensity distribution LID4 is formed in the space to be detected 10R. As shown by arrows in FIG. 8B and a solid line F2 in FIG. 7A which indicate the light intensity, in the fourth light intensity distribution LID4, the intensity from the angular direction corresponding to the one end LG1 of the light guide LG to the angular direction corresponding to the other end LG2 is constant in the radiation angle range of the second detection light L2t. However, as schematically shown in FIG. 7B, the light intensity in the Z-axis direction changes in the fourth light intensity distribution LID4.

In addition, the second light source section 12B is driven after driving of the first light source section 12A. In the second light source section 12B, also when each light emitting element 120 is sequentially turned on, the first light intensity distribution LID1, the second light intensity distribution LID2, the third light intensity distribution LID3, and the fourth light intensity distribution LID4 are sequentially formed in the space to be detected 10R, in the same manner as when each light emitting element 120 is sequentially turned on in the first light source section 12A.

Principle of Detecting the XY Coordinates (Angular Position)

Figure 9A:
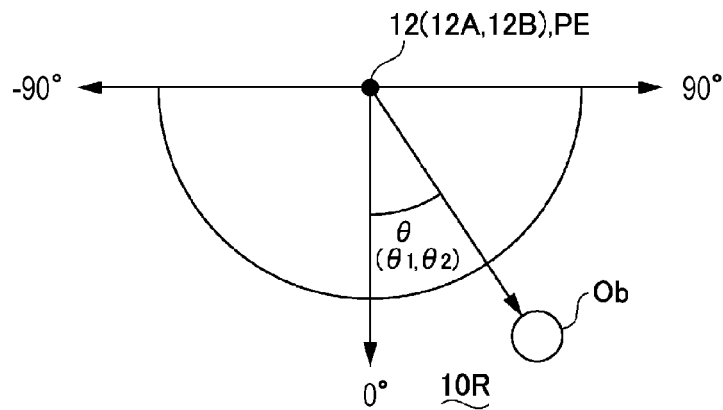
FIGS. 9A and 9B are explanatory views showing the principle of detecting the XY coordinates (angular position) in the optical position detection device according to the first embodiment of the invention.
Figure 9B:
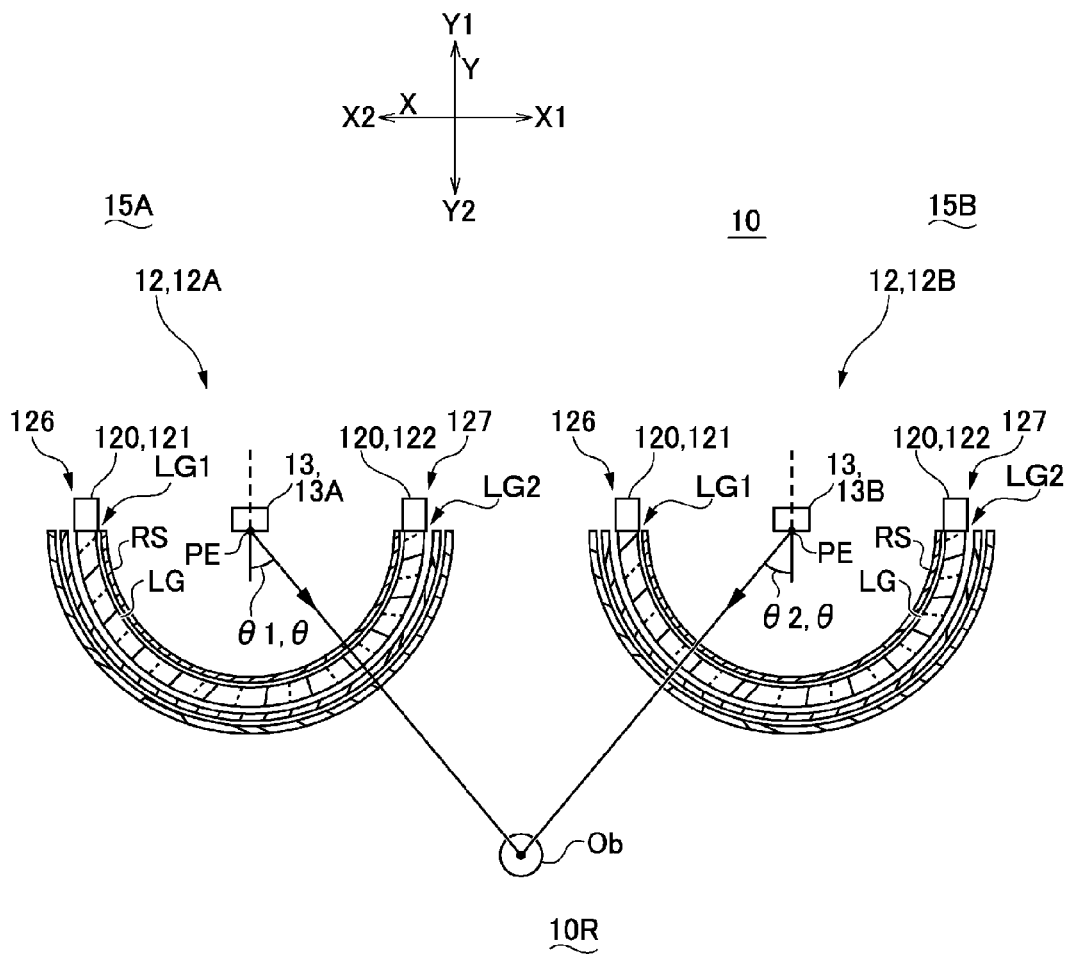

FIGS. 9A and 9B are explanatory views showing the principle of detecting the XY coordinates (angular position) in the optical position detection device 10 according to the first embodiment of the invention. FIG. 9A is an explanatory view of a method of acquiring the position information (azimuth information) regarding the position where a target object is present, and FIG. 9B is an explanatory view showing the principle of acquiring the XY coordinate data of the target object Ob.

In the optical position detection device 10 according to the present embodiment, when the first light intensity distribution LID1 is formed in the first period by the first light source module 126 of the first light source section 12A, the emission direction of the detection light L2 and the intensity of the detection light L2 are in the linear relationship shown by the dotted line E1 in FIG. 7A. In addition, when the second light intensity distribution LID2 is formed in the second period by the second light source module 127 of the first light source section 12A, the emission direction of the detection light L2 and the intensity of the detection light L2 are in the linear relationship shown by the dot-dash line E2 in FIG. 7A. Here, as shown in FIGS. 9A and 9B, it is assumed that the target object Ob is present in a direction of an angle θ when viewed from the center PE of the first light source section 12A (center of the first light source module 126/radiation center of the detection light L2). In this case, when the first light intensity distribution LID1 is formed, the intensity of the detection light L2 at the position where the target object Ob is present becomes INT1. On the other hand, when the second light intensity distribution LID2 is formed, the intensity of the detection light L2 at the position where the target object Ob is present becomes INT2. Accordingly, if the relationship between the intensities INT1 and INT2 is obtained by comparing the received light intensity in the first light receiving section 13A when the first light intensity distribution LID1 is formed with the received light intensity in the first light receiving section 13A when the second light intensity distribution LID2 is formed, it is possible to calculate the angle θ (angle θ1/angular position) in a direction, in which the target object Ob is located, with the center PE of the first light source section 12A as a reference, as shown in FIGS. 9A and 9B.

In the present embodiment, when detecting the angular position (angle θ1) of the target object Ob using such a principle, the first driving current value for the first light emitting element 121 and the second driving current value for the second light emitting element 122 are adjusted such that the received light intensity in the first light receiving section 13A when the first light intensity distribution LID1 is formed by the first light source module 126 in the first light source section 12A becomes equal to the received light intensity in the first light receiving section 13A when the second light intensity distribution LID2 is formed by the second light source module 127. Here, the emission intensity of the detection light L2 emitted from the first light source section 12A is proportional to the first driving current value for the first light emitting element 121 and the second driving current value for the second light emitting element 122. Therefore, the angle θ (angle θ1) in a direction in which the target object Ob is located can be calculated from the ratio or the difference between the first and second driving current values after adjusting the first driving current value for the first light emitting element 121 and the second driving current value for the fourth light emitting element 124 or from the ratio or the difference between the adjustment amounts when the driving current values are adjusted.

More specifically, first, the light source driving unit 51 of the first control IC 70A shown in FIG. 6A forms the first light intensity distribution LID1 by turning on the first light emitting element 121 in the first period as the first lighting operation and then forms the second light intensity distribution LID2 by turning on the fourth light emitting element 124 in the second period as the second lighting operation. In this case, the intensity change directions of the first light intensity distribution LID1 and the second light intensity distribution LID2 are in opposite directions, but the intensity levels of the first light intensity distribution LID1 and the second light intensity distribution LID2 are the same. Then, the adjustment amount calculating section 74 of the position detecting section 50 shown in FIG. 6A compares the received light intensity INT1 of the first light receiving section 13A at the time of the first lighting operation with the received light intensity INT2 of the first light receiving section 13A at the time of the second lighting operation. As a result, if the received light intensity INT1 of the first light receiving section 13A at the time of the first lighting operation is equal to the received light intensity INT2 of the first light receiving section 13A at the time of the second lighting operation, the angular position of the target object Ob is 0°.

On the other hand, when the received light intensities INT1 and INT2 are different, the first driving current value for the first light emitting element 121 and the second driving current value for the second light emitting element 122 are adjusted such that the received light intensity INT1 of the first light receiving section 13A at the time of the first lighting operation becomes equal to the received light intensity INT2 of the first light receiving section 13A at the time of the second lighting operation. Then, if the received light intensity INT1 of the first light receiving section 13A at the time of the first lighting operation and the received light intensity INT2 of the first light receiving section 13A at the time of the second lighting operation are equal when the first and second lighting operations are performed again, the first angular position detecting section 551 shown in FIG. 6A calculates the angle θ (angle θ1) in a direction in which the target object Ob is located from the ratio or the difference between the driving currents for the first and second light emitting elements 121 and 122 after performing such adjustment or from the ratio or the difference between the adjustment amounts of the driving currents (refer to FIGS. 9A and 9B).

If this operation is also performed in the second light source section 12B, the second angular position detecting section 552 shown in FIG. 6A can calculate the angle θ (angle θ2/angular position) in a direction in which the target object Ob is located with the center PE of the second light source section 12B as a reference. Therefore, the coordinate data decision section 553 shown in FIG. 6A can acquire, as data of the XY coordinates at which the target object Ob is located, a position equivalent to the point of intersection between the angular position (direction of the angle θ1) detected by the first angular position detecting section 551 and the angular position (direction of the angle θ2) detected by the second angular position detecting section 552 (refer to FIGS. 9A and 9B).

Specific Detection Operation of XY Coordinates (Angular Position)

Figure 10A:
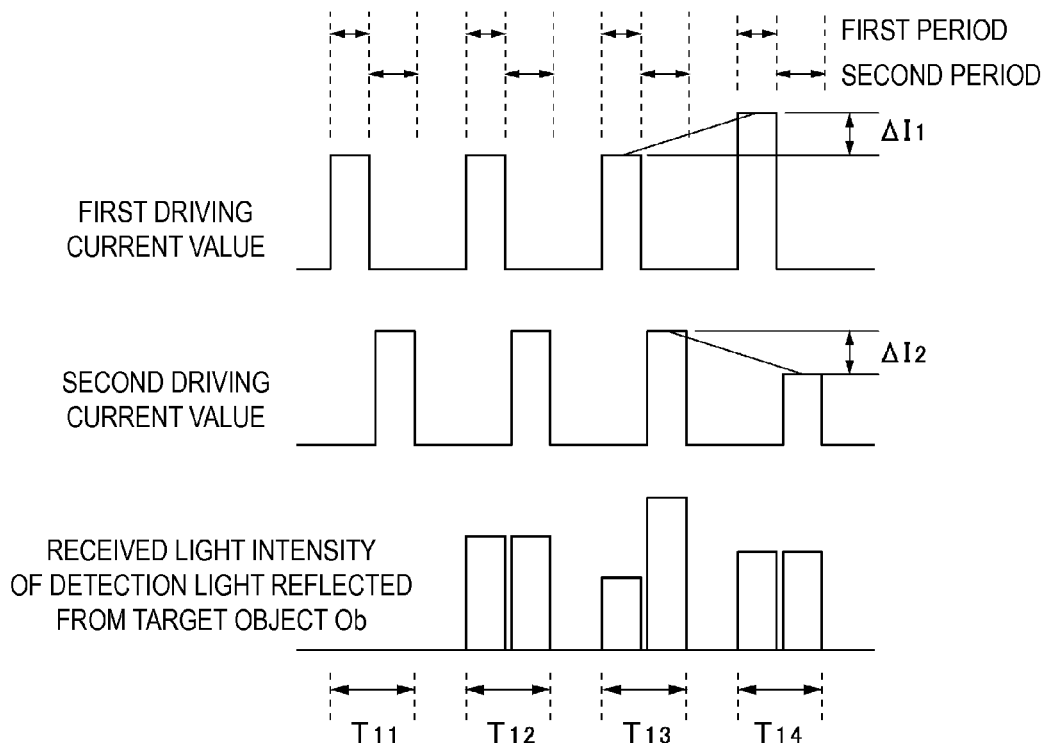
FIGS. 10A and 10B are explanatory views showing a position detection operation in the optical position detection device according to the first embodiment of the invention.
Figure 10B:
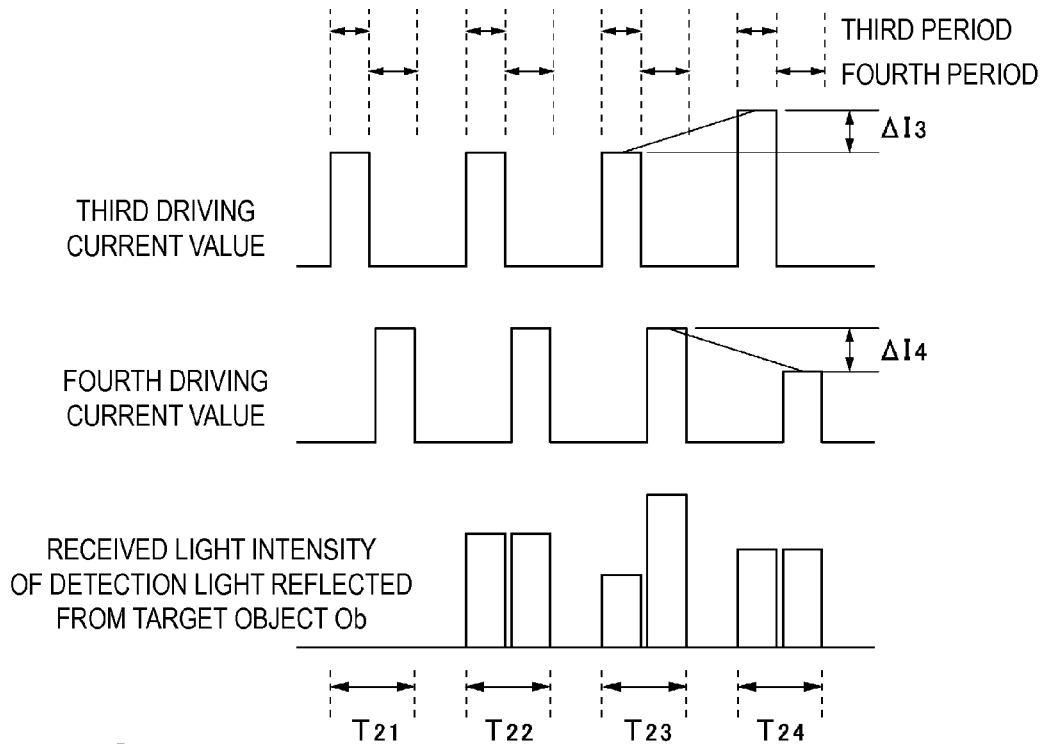

FIGS. 10A and 10B are explanatory views showing a position detection operation in the optical position detection device 10 according to the first embodiment of the invention. FIG. 10A is an explanatory view showing a detection operation of the XY coordinates (angular position), and FIG. 10B is an explanatory view showing a detection operation of the position (position in the Z-axis direction) of the target object Ob in the Z-axis direction. In addition, light components, such as ambient light, other than the detection light L2 reflected from the target object Ob are omitted in FIGS. 10A and 10B.

First, to detect the XY coordinates (angular position) of the target object Ob in the optical position detection device 10 according to the present embodiment, the light emitting element 120 is sequentially turned on by setting the first driving current value for the first light emitting element 121 and the second driving current value for the fourth light emitting element 124 to default values in first and second periods in a default state where the target object Ob is not present in the space to be detected 10R in a period T11 shown in FIG. 10A. In this case, the received light intensity in the light receiving section 13 is 0.

Then, when the target object Ob appears in the space to be detected 10R in a period T12, the light receiving section 13 receives the reflected light L3 reflected from the target object Ob. Here, it is known that the angular position of the target object Ob is 0° when the received light intensity in the light receiving section 13 is the same in the first and second periods.

In contrast, when the received light intensity in the light receiving section 13 is different in the first and second periods as in a period T13, the value of the first driving current supplied in the first period and the value of the second driving current supplied in the second period are adjusted such that the received light intensity in the light receiving section 13 becomes the same in the first and second periods as in a period T14. Then, when the received light intensity in the light receiving section 13 becomes equal in the first and second periods, the angular position of the target object Ob can be detected if a difference between the adjustment amount ΔI1 of the first driving current value and the adjustment amount ΔI2 of the second driving current value is used. FIG. 10A illustrates a case where the first driving current value is increased and the second driving current value is decreased in the period T14 compared with the period T3.

Principle of Detecting the Position of the Target Object Ob in the Z-Axis Direction In the optical position detection device 10 according to the present embodiment, the same principle as when detecting the XY coordinate (angular position) is also used when detecting the position of the target object Ob in the Z-axis direction of the target object Ob. More specifically, as shown in FIG. 8A, when the third light intensity distribution LID3 is formed in the third period by the first light source module 126 of the first light source section 12A, the position in the Z-axis direction and the intensity of the detection light L2 are in the relationship shown by the dotted line E3 in FIG. 7B. In addition, when the fourth light intensity distribution LID4 is formed in the fourth period by the second light source module 127 of the first light source section 12A, the position in the Z-axis direction and the intensity of the detection light L2 are in the relationship shown by the dot-dash line E4 in FIG. 7B. Accordingly, when the third light intensity distribution LID3 is formed, the intensity of the detection light L2 at the position where the target object Ob is present becomes INT3. In addition, when the fourth light intensity distribution LID4 is formed, the intensity of the detection light L2 at the position where the target object Ob is present becomes INT4. Therefore, the position of the target object Ob in the Z-axis direction can be calculated if the relationship between the intensities INT3 and INT4 is obtained by comparing the received light intensity in the first light receiving section 13A when the third light intensity distribution LID3 is formed with the received light intensity in the first light receiving section 13A when the fourth light intensity distribution LID4 is formed.

In the present embodiment, when detecting the position of the target object Ob in the Z-axis direction using such a principle, the third driving current value for the first and second light emitting elements 121 and 122 and the fourth driving current value for the third and fourth light emitting elements 123 and 124 are adjusted such that the received light intensity in the first light receiving section 13A when the third light intensity distribution LID3 is formed by the first light source module 126 in the first light source section 12A becomes equal to the received light intensity in the first light receiving section 13A when the fourth light intensity distribution LID4 is formed by the second light source module 127. Here, the emission intensity of the detection light L2 emitted from the first light source section 12A is proportional to the third driving current value for the first and second light emitting elements 121 and 122 and the fourth driving current value for the third and fourth light emitting elements 123 and 124. Therefore, the first Z-axis direction position detecting section 556 shown in FIG. 6A can calculate the position of the target object Ob in the Z-axis direction from the ratio or the difference between the third and fourth driving current values after adjusting the third driving current value for the first and second light emitting elements 121 and 122 and the fourth driving current value for the third and fourth light emitting elements 123 and 124 or from the ratio or the difference between the adjustment amounts when the driving current values are adjusted. In addition, the third driving current value is the sum of the driving currents supplied to the first and second light emitting elements 121 and 122, and the fourth driving current value is the sum of the driving currents supplied to the third and fourth light emitting elements 123 and 124.

When this operation is also performed in the second light source section 12B, the second Z-axis direction position detecting section 557 shown in FIG. 6A can calculate the position of the target object Ob in the Z-axis direction from the ratio or the difference between the third and fourth driving current values after adjusting the third driving current value for the first and second light emitting elements 121 and 122 and the fourth driving current value for the third and fourth light emitting elements 123 and 124 or from the ratio or the difference between the adjustment amounts when the driving current values are adjusted. Therefore, the coordinate data acquisition section 55 shown in FIG. 6A can acquire the position data of the target object Ob in the Z-axis direction in addition to the XY coordinate data of the target object Ob. In addition, in the present embodiment, the position data in the Z-axis direction when the first light source section 12A is driven and the position data in the Z-axis direction when the second light source section 12B is driven are acquired. Accordingly, the coordinate data acquisition section 55 picks one of the two position data items as the position of the target object Ob in the Z-axis direction on the basis of the average of the two position data items or the XY coordinate data of the target object Ob.

Operation of Detecting the Position in the Z-Axis Direction

Figure 11A:
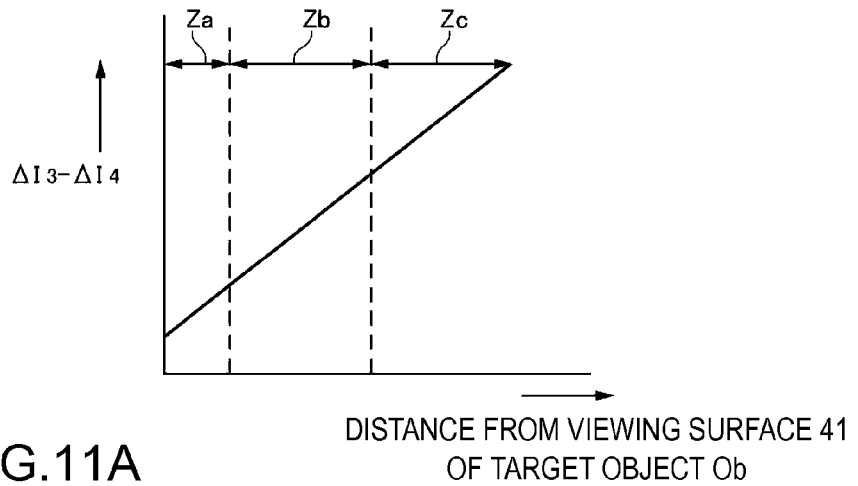
FIGS. 11A to 11E are explanatory views showing a position detection operation in the Z-axis direction in the optical position detection device according to the first embodiment of the invention.
Figure 11B:
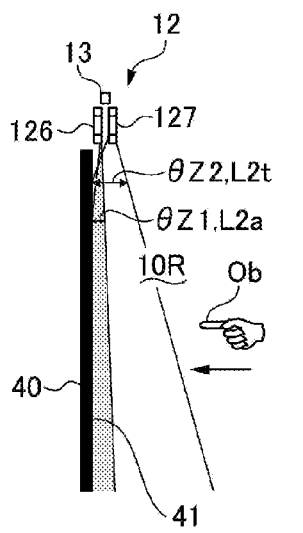
Figure 11C:
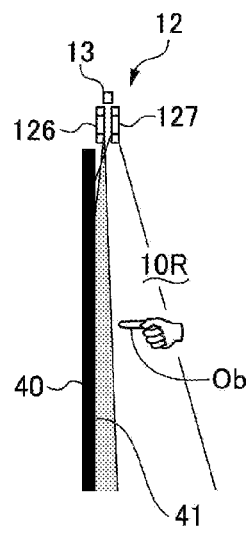
Figure 11D:
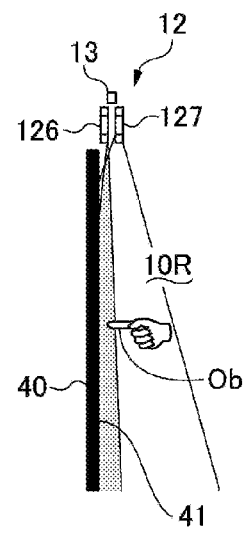
Figure 11E:
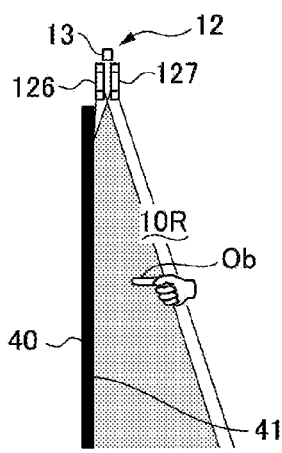

FIGS. 11A to 11E are explanatory views showing a position detection operation in the Z-axis direction in the optical position detection device 10 according to the first embodiment of the invention. FIG. 11A is a graph showing the relationship between the position of the target object Ob in the Z-axis direction and the difference between the adjustment amounts, and FIGS. 11B to 11D are explanatory views showing the positional relationship between the target object Ob and the viewing surface forming member 40. In addition, FIG. 11E is an explanatory view when the emission angle range of first detection light in the Z-axis direction and the emission angle range of second detection light in the Z-axis direction are equal. In addition, FIGS. 11B to 11D show a part with a relatively high light intensity of the first and second detection light components in a gray region.

First, to detect the position of the target object Ob in the Z-axis direction in the optical position detection device 10 according to the present embodiment, the light emitting element 120 is sequentially turned on by setting the third driving current value for the first and second light emitting elements 121 and 122 and the fourth driving current value for the third and fourth light emitting elements 123 and 124 to default values in third and fourth periods in a default state where the target object Ob is not present in the space to be detected 10R in a period T21 shown in FIG. 10B. As a result, the received light intensity in the light receiving section 13 is 0.

Then, when the target object Ob appears in the space to be detected 10R in a period T22, the light receiving section 13 receives the reflected light L3 reflected from the target object Ob. Here, it is known that the target object Ob is located at the position Zm in FIG. 7B when the received light intensity in the light receiving section 13 is the same in the third and fourth periods.

In contrast, when the received light intensity in the light receiving section 13 is different in the third and fourth periods as in a period T23, the value of the third driving current supplied in the third period and the value of the fourth driving current supplied in the fourth period are adjusted such that the received light intensity in the light receiving section 13 becomes the same in the third and fourth periods as in a period T24. Then, when the received light intensity in the light receiving section 13 becomes equal in the third and fourth periods, the position of the target object Ob in the Z-axis direction can be detected if a difference between the adjustment amount $\Delta I3$ of the third driving current value and the adjustment amount $\Delta I4$ of the fourth driving current value is used. FIG. 10B illustrates a case where the third driving current value is increased and the fourth driving current value is decreased in the period T24 compared with the period T23.

Thus, if the position of the target object Ob in the Z-axis direction is detected, the viewing surface forming member 40 and the position of the target object Ob can be detected, as shown in FIGS. 11A to 11E. That is, when the target object Ob moves from the position shown in FIG. 11B to the position shown in FIG. 11D through the position shown in FIG. 11C, a difference ($\Delta I3 - \Delta I4$) between the adjustment amount $\Delta I3$ of the third driving current value and the adjustment amount $\Delta I4$ of the fourth driving current value changes as schematically shown in FIG. 11A. Accordingly, when inputting the information on the basis of the instructed position (XY coordinate data) of the target object Ob within the XY plane with respect to the viewing surface 41, the control device 60 shown in FIG. 6A can determine that information input by the target object Ob is not performed if the difference ($\Delta I3 - \Delta I4$) between the adjustment amounts is large, as shown in a region Zc in FIG. 11A. Then, as shown in a region Zb in FIG. 11A, the control device 60 shown in FIG. 6A can determine the input information in advance on the basis of the XY coordinate data of the target object Ob when the difference ($\Delta I3 - \Delta I4$) between the adjustment amounts falls within a predetermined range. Then, as shown in a region Za in FIG. 11A, the control device 60 shown in FIG. 6A can determine that the input information corresponding to the XY coordinate data of the target object Ob has been decided when the difference ($\Delta I3 - \Delta I4$) between the adjustment amounts is smaller than a predetermined threshold value.

In the present embodiment, an emission angle range $\theta z1$ of the first detection light L2s in the Z-axis direction which is emitted from the first light source module 126 is narrower than an emission angle range $\theta z2$ of the second detection light L2t in the Z-axis direction which is emitted from the second light source module 127. For this reason, in the present embodiment, the amount of overlap between the first detection light L2s and the second detection light L2t is small as shown in FIG. 11E, compared with the emission angle range θz1 of the first detection light L2s in the Z-axis direction which is emitted from the first light source module 126 and the emission angle range θz2 of the second detection light L2t in the Z-axis direction which is emitted from the second light source module 127 are wide. Thus, according to the present embodiment, from the form shown in FIG. 11E, a change in the difference between the adjustment amounts when the target object Ob is displaced by the fixed distance in the Z-axis direction is large in the graph shown in FIG. 11A. Therefore, the position of the target object Ob in the Z-axis direction can be reliably detected.

Main Effects of the Present Embodiment

As described above, in the optical position detection device 10 according to the present embodiment, the light source section 12 radially emits the detection light L2 and also forms the light intensity distribution (first light intensity distribution LID1 and second light intensity distribution LID2) in which the intensity changes from one side toward the other side in the radiation angle range of the detection light L2, and the light receiving section 13 receives the detection light L2 reflected from the target object Ob located in the space to be detected 10R in which the light intensity distribution is formed. Here, since the intensity of the detection light L2 reflected from the target object Ob is proportional to the intensity in a place where the target object Ob is located in the light intensity distribution, the received light intensity in the light receiving section 13 corresponds to the position of the target object Ob. Therefore, the position detecting section 50 can detect the position of the target object Ob on the basis of the received light intensity in the light receiving section 13. According to this method, since the light intensity distribution of the detection light L2 radially emitted from the light source section 12 is used, the light intensity distribution can be formed over the wide space. That is, the space to be detected 10R is wide.

In addition, in the optical position detection device 10 according to the present embodiment, the first and second light source modules 126 and 127 emit the first detection light L2s and the second detection light L2t for XY coordinate detection along the virtual plane defined by the X-axis direction and the Y-axis direction, and the light receiving section 13 receives detection light reflected from the target object Ob located in a detection light emission space (space to be detected 10R). Accordingly, the position detecting section 50 can detect the angular direction of the target object Ob within the XY plane (position of the target object Ob in the X-axis direction and the Y-axis direction) on the basis of the received light intensity in the light receiving section 13. In this case, since the first detection light L2s and the second detection light L2t are emitted radially, it is possible to emit the detection light L2 with sufficient intensity for the entire space to be detected. Accordingly, the space to be detected 10R in the X-axis direction and the Y-axis direction is wide.

In addition, in the optical position detection device 10 according to the present embodiment, the first and second light source modules 126 and 127 emit the first detection light L2s and the second detection light L2t for Z-axis direction position detection from the positions separated from each other in the Z-axis direction. Therefore, the position detecting section 50 can detect the position of the target object Ob in the Z-axis direction on the basis of the received light intensity in the light receiving section 13. In this case, since the first detection light L2s and the second detection light L2t are emitted radially, it is possible to emit the detection light L2 with sufficient intensity for the entire space to be detected 10R. Therefore, according to the present embodiment, the position of the target object Ob in the Z-axis direction can also be detected in the space to be detected 10R which is wide in the X-axis direction and the Y-axis direction.

In addition, in the present embodiment, the emission angle range of the first detection light L2s in the Z-axis direction when detecting the position in the Z-axis direction is narrower than the emission angle range of the second detection light L2t in the Z-axis direction when detecting the position in the Z-axis direction. Accordingly, when the distance between the first and second light source modules 126 and 127 in the Z-axis direction is small, an overlapping portion of the first detection light L2s and the second detection light L2t in the Z-axis direction can be made narrow. Therefore, even when the distance between the first and second light source modules 126 and 127 in the Z-axis direction is small, the position of the target object Ob in the Z-axis direction can be detected reliably.

In the embodiment of the invention, the position detecting section 50 detects the position of the target object Ob on the basis of a comparison result of the received light intensity of the first detection light L2s in the light receiving section 13 and the received light intensity of the second detection light L2t. For this reason, the influence of ambient light, such as outside light, and the like can be eliminated. Moreover, in the present embodiment, when detecting the position of the target object Ob on the basis of the comparison result of the received light intensity of the first detection light L2s in the light receiving section 13 and the received light intensity of the second detection light L2t, the XY coordinate data of the target object Ob is detected using a comparison result of the first and second driving current values when the received light intensity of the first detection light L2s in the light receiving section 13 becomes equal to the received light intensity of the second detection light L2t in the first and second periods. In addition, the position of the target object Ob in the Z-axis direction is detected using a comparison result of the third and fourth driving current values when the received light intensity of the first detection light L2s in the light receiving section 13 becomes equal to the received light intensity of the second detection light L2t in the third and fourth periods. Therefore, even if the sensitivity of the light receiving section 13 changes, the position of the target object Ob can be accurately detected.

In addition, both the first and second light source modules 126 and 127 include the light emitting element 120 and the light guide LG. Accordingly, since the detection light L2 emitted from the light emitting element 120 is output through the light guide LG, it is possible to form a light intensity distribution in which the light intensity changes continuously. In addition, there is an advantage in that the XY coordinate data of the target object and the position of the target object in the Z-axis direction can be detected with a small number of light emitting elements 120.

Second Embodiment

Configuration of a Light Emission and Reception Unit

Figure 12:
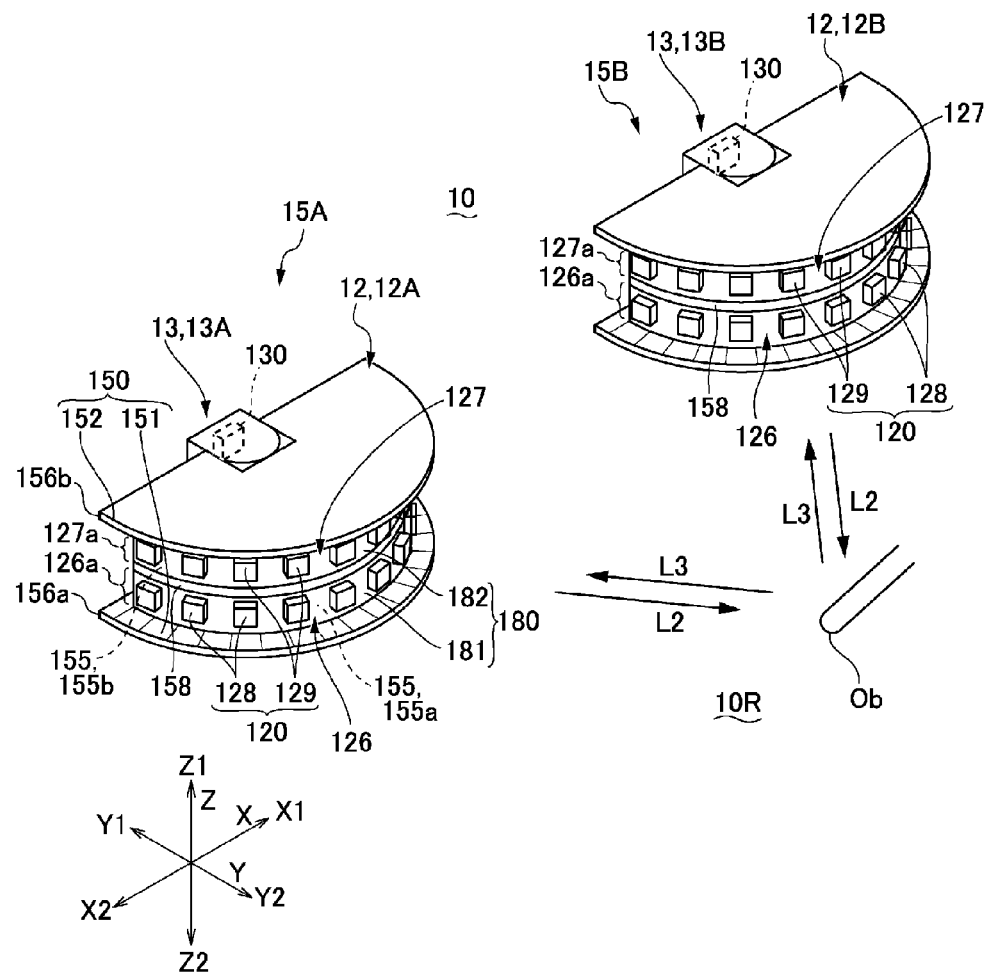
FIG. 12 is an explanatory view of a light emission and reception unit of an optical position detection device according to a second embodiment of the invention.

FIG. 12 is an explanatory view of a light emission and reception unit of an optical position detection device 10 according to a second embodiment of the invention. In addition, since the basic configuration in the present embodiment is the same as that in the first embodiment, the same components are denoted by the same reference numerals, and a duplicate explanation thereof will be omitted.

Although the light guide LG is used in the light source section 12 in the first embodiment, the XY coordinate of the target object Ob is detected in the same way as the first embodiment without using a light guide in the present embodiment. More specifically, as shown in FIG. 12, each of the light source sections 12 (first and second light source sections 12A and 12B) of the optical position detection device 10 according to the present embodiment includes the plurality of light emitting elements 120 distributed in an array in the circumferential direction, a belt-like flexible substrate 180 on which the plurality of light emitting elements 120 are mounted, and the fan-shaped or semicircular light source support member 150 with a convex surface 155 which extends with a curved shape in the longitudinal direction (circumferential direction). In the present embodiment, the convex surface 155 has a curved shape in an arc in the longitudinal direction (circumferential direction).

In the present embodiment, a first belt-like flexible substrate 181 and a second belt-like flexible substrate 182 disposed in parallel to the first flexible substrate 181 in the width direction (Z-axis direction) are used as the flexible substrate 180. Accordingly, the first light source module 126 is formed by the first flexible substrate 181 and the light emitting element 120 (light emitting element for emission of first detection light 128) mounted in the longitudinal (circumferential) direction of the first flexible substrate 181. In addition, the second light source module 127 is formed by the second flexible substrate 182 and the light emitting element 120 (light emitting element for emission of second detection light 129) mounted in the longitudinal direction of the second flexible substrate 182. Also in the present embodiment, an LED is used as each of the light emitting elements 120 as in the first embodiment.

In addition, also in the two light source sections 12 (first and second light source sections 12A and 12B), the light source support member 150 has a structure in which the first and second light source support members 151 and 152 overlap each other in the Z-axis direction, and the first and second light source support members 151 and 152 are symmetrical in the Z-axis direction. The first light source support member 151 includes an arc-shaped convex surface 155a, which forms a lower half portion of the convex surface 155, and a fan-shaped or semicircular flange 156a protruding from the convex surface 155a at the opposite end to a side where the second light source support member 152 is located on the convex surface 155a. The first flexible substrate 181 is disposed on the convex surface 155a so as to overlap each other. The second light source support member 152 includes an arc-shaped convex surface 155b, which forms an upper half portion of the convex surface 155, and a fan-shaped or semicircular flange 156b protruding from the convex surface 155b at the opposite end to a side where the first light source support member 151 is located on the convex surface 155b. The second flexible substrate 182 is disposed on the convex surface 155b so as to overlap each other. Here, a portion interposed in the Z-axis direction by the first and second flexible substrates 181 and 182 is the transmissive light guide section 158, and the light receiving element 130 of the light receiving section 13 is disposed at the back of the light guide section 158.

In the first light source module 126 with such a configuration, the first light emitting section 126a is formed by the surface side of the first flexible substrate 181 where the light emitting element 120 is mounted, and the first light source module 126 emits the first detection light L2s in the circumferential direction of the first light emitting section 126a. In addition, in the second light source module 127, the second light emitting section 127a is formed by the surface side of the second flexible substrate 182 where the light emitting element 120 is mounted, and the second light source module 127 emits the second detection light L2t in the circumferential direction of the second light emitting section 127a.

Configuration of the Light Source Driving Unit 51

Figure 13A:
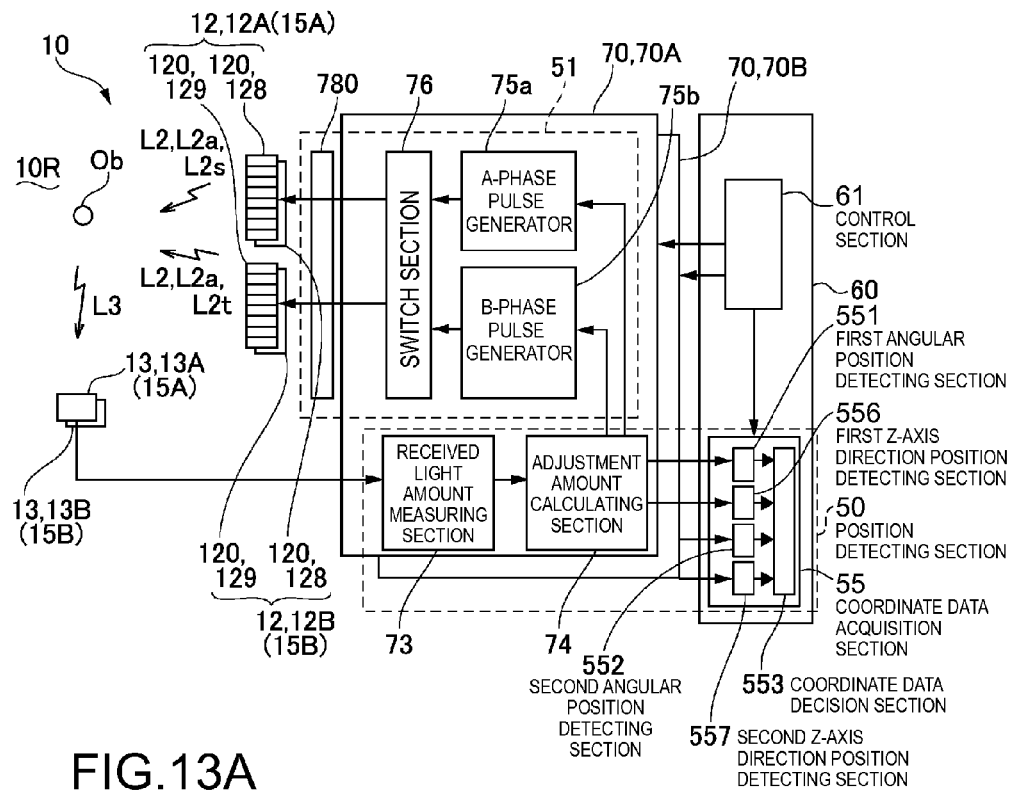
FIGS. 13A to 13C are explanatory views showing the electrical configuration of the optical position detection device according to the second embodiment of the invention.
Figure 13B:
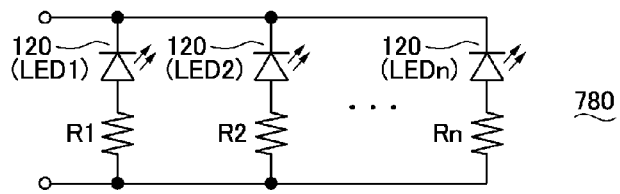
Figure 13C:
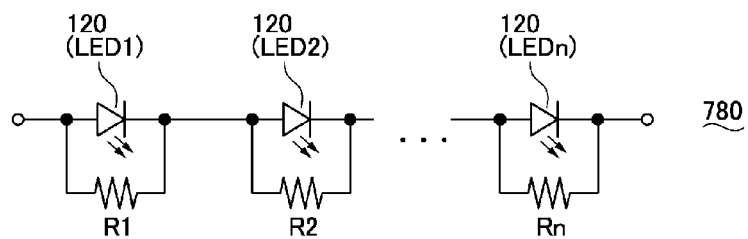

FIGS. 13A to 13C are explanatory views showing the electrical configuration and the like of the optical position detection device 10 according to the second embodiment of the invention. FIG. 13A is an explanatory view showing the configuration of a control IC, FIG. 13B is an explanatory view showing a driving current balance adjusting circuit of the light source driving unit 51, and FIG. 13C is an explanatory view of another driving current balance adjusting circuit.

As shown in FIG. 13A, in the optical position detection device 10 according to the present embodiment, the light source driving unit 51 includes a driving current balance adjusting circuit 780. When driving the light emitting element 120, the light source driving unit 51 performs switching between a state where the light emitting element 120 is driven through the driving current balance adjusting circuit 780 and a state where the light emitting element 120 is driven without the help of the driving current balance adjusting circuit 780. When detecting the angular position of the target object Ob, the driving current balance adjusting circuit 780 adjusts the balance of the emission intensities of the plurality of light emitting elements 120 by adjusting the balance of the driving currents supplied to the plurality of light emitting elements 120. As shown in FIG. 13B, the driving current balance adjusting circuit 780 is formed as a resistance circuit in which resistors R1, R2, . . . , and Rn are connected in series to the plurality of corresponding light emitting elements 120, for example. The balance of the emission intensities of the plurality of light emitting elements 120 can be adjusted by optimizing the resistance of each of the resistors R1, R2, . . . , and Rn. In addition, as shown in FIG. 13C, the driving current balance adjusting circuit 780 can be formed as a resistance circuit in which the resistors R1, R2, . . . , and Rn are connected in parallel to the plurality of corresponding light emitting elements 120. Also in this case, the balance of the emission intensities of the plurality of light emitting elements 120 can be adjusted by optimizing the resistance of each of the resistors R1, R2, . . . , and Rn.

Position Detection Operation

Figure 14A:
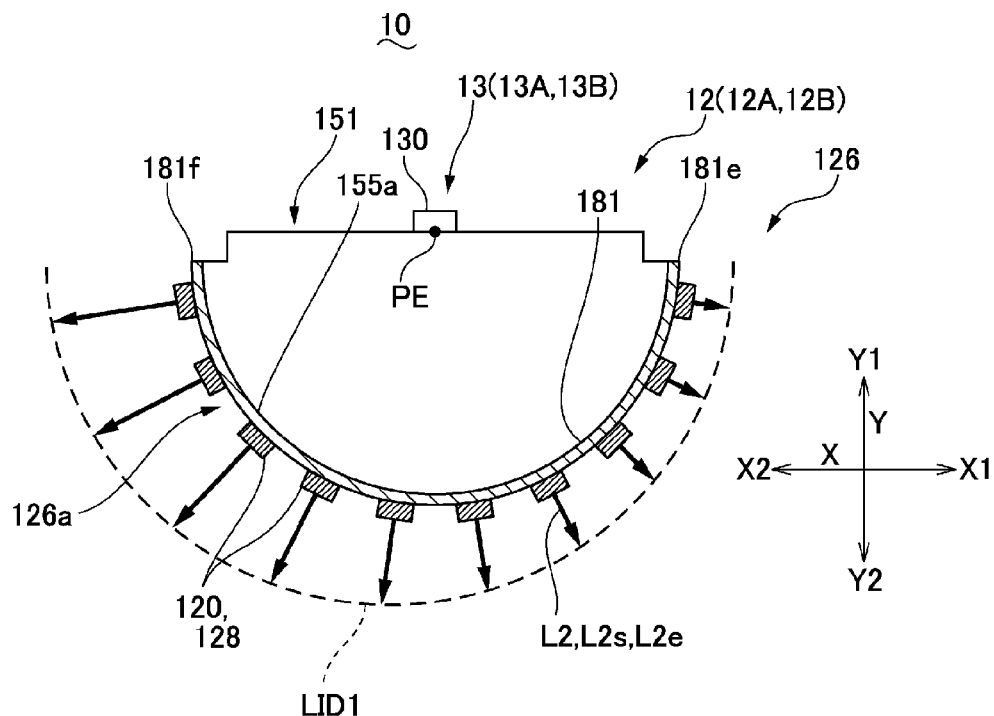
FIGS. 14A and 14B are explanatory views of detection light emitted from a light source section when detecting the angular position of the target object in the optical position detection device according to the second embodiment of the invention.
Figure 14B:
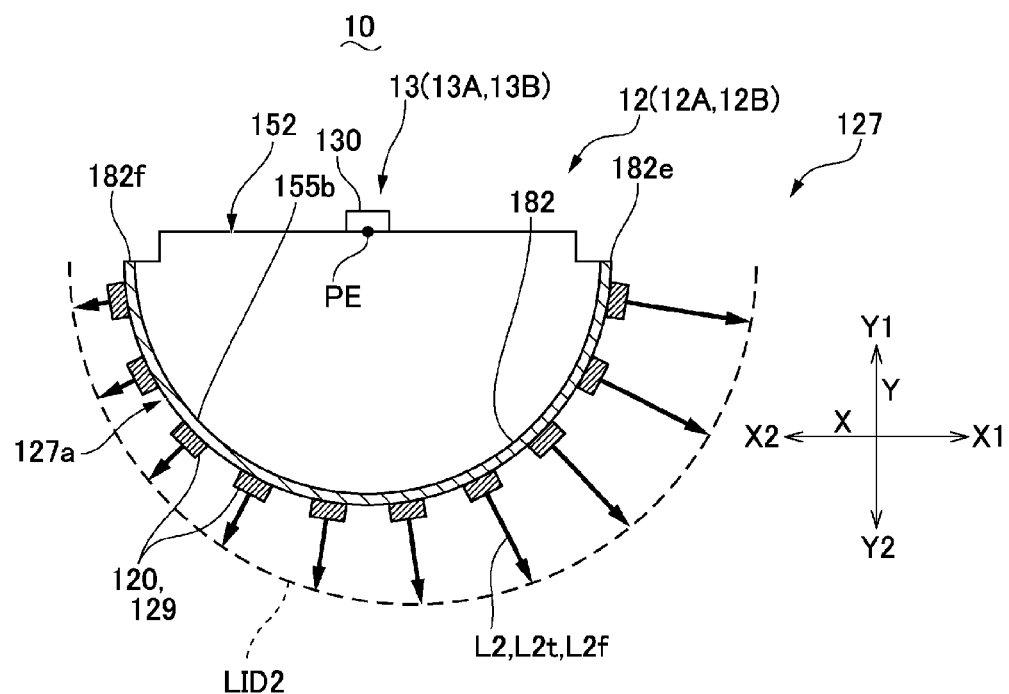
Figure 15A:
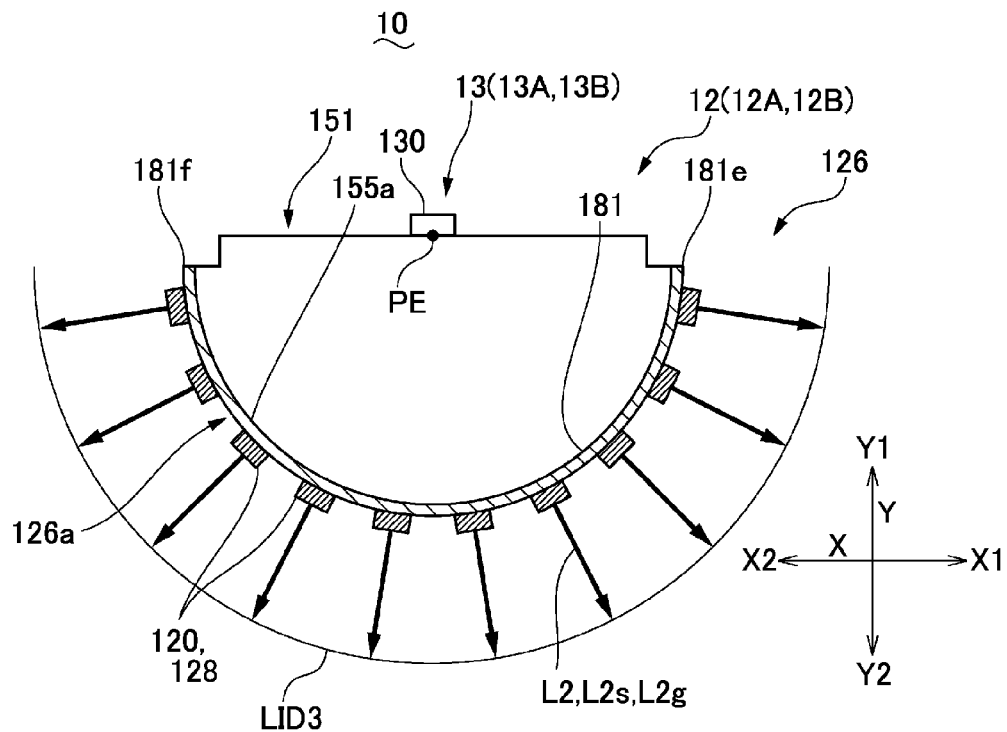
FIGS. 15A and 15B are explanatory views of detection light emitted from a light source section when detecting the position of the target object in the Z-axis direction in the optical position detection device according to the second embodiment of the invention.
Figure 15B:
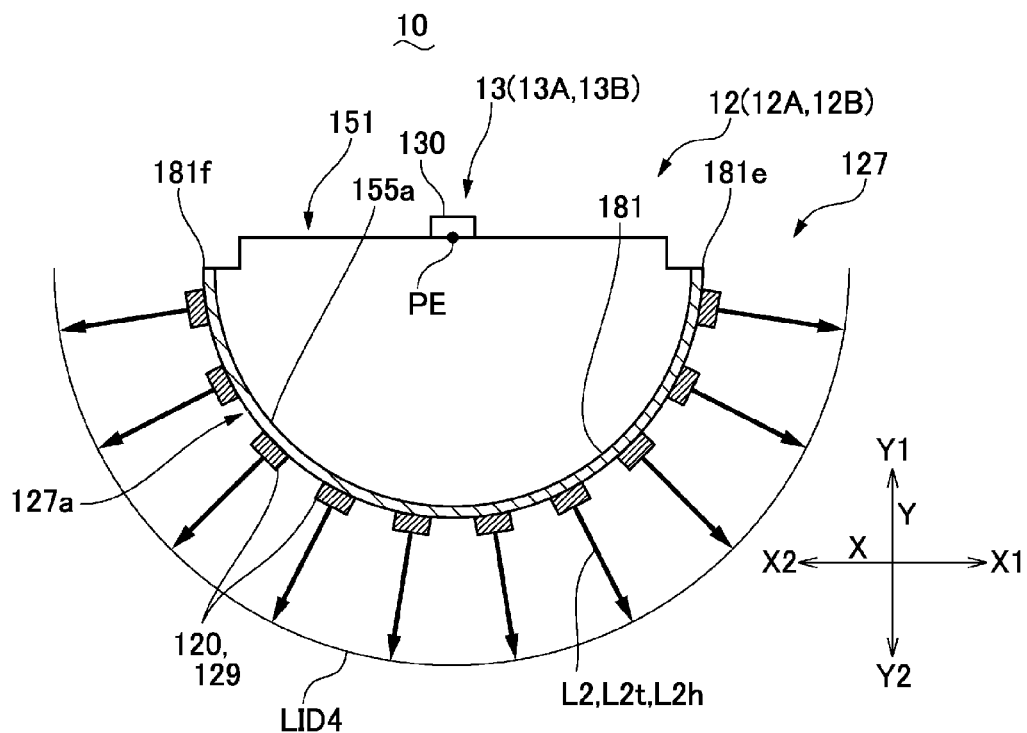

FIGS. 14A and 14B are explanatory views of the detection light L2 emitted from the light source section 12 when detecting the angular position of the target object Ob in the optical position detection device 10 according to the second embodiment of the invention. FIG. 14A is an explanatory view of the first detection light L2s (first detection light for XY coordinate detection L2e) emitted in the first period, and FIG. 14B is an explanatory view of the second detection light L2t (second detection light for XY coordinate detection L2f) emitted in the second period. FIGS. 15A and 15B are explanatory views of the detection light L2 emitted from the light source section 12 when detecting the position of the target object Ob in the Z-axis direction in the optical position detection device 10 according to the second embodiment of the invention. FIG. 15A is an explanatory view of the first detection light L2s (first detection light for Z-axis direction position detection L2g) emitted in the third period, and FIG. 15B is an explanatory view of the second detection light L2t (second detection light for Z-axis direction position detection L2h) emitted in the fourth period.

To detect the position of the target object Ob in the space to be detected 10R in the optical position detection device 10 according to the present embodiment, all of the plurality of light emitting elements 120 (light emitting elements for emission of first detection light 128) mounted on the first flexible substrate 181 and the plurality of light emitting elements 120 (light emitting elements for emission of second detection light 129) mounted on the second flexible substrate 182 are turned on in different periods.

First, when detecting the angular position of the target object Ob, all of the plurality of light emitting elements for emission of first detection light 128 are turned on and all of the plurality of light emitting elements for emission of second detection light 129 are turned off in the first period (first lighting operation). In this case, as shown by arrows indicating the level of the emission intensity in FIG. 14A, the driving current balance adjusting circuit 780 described with reference to FIGS. 13A to 13C decreases the emission intensity of the light emitting element for emission of first detection light 128 from the side, at which an end 181f at one side of the first flexible substrate 181 in the longitudinal (circumferential) direction is located, toward the side, at which an end 181e at the other side of the first flexible substrate 181 is located. Accordingly, in the first light intensity distribution LID1 of the first detection light L2s emitted to the space to be detected 10R, the light intensity is high in the angular direction in which the end 181f at one side of the first flexible substrate 181 in the longitudinal direction is located, and the light intensity continuously decreases from there toward the angular direction in which the end 181e at the other side is located.

On the other hand, in the second period, all of the plurality of light emitting elements for emission of second detection light 129 are turned on and all of the plurality of light emitting elements for emission of first detection light 128 are turned off (second lighting operation). In this case, as shown by arrows indicating the level of the emission intensity in FIG. 14B, the emission intensity of the light emitting element for emission of second detection light 129 is decreased from the side, at which an end 182e at the other side of the second flexible substrate 182 in the longitudinal (circumferential) direction is located, toward the side, at which an end 182f at the one side of the second flexible substrate 182 is located. Accordingly, in the second light intensity distribution L1D2 of the second detection light L2t emitted to the space to be detected 10R, the light intensity is high in the angular direction in which the end 182e at the other side of the second flexible substrate 182 in the longitudinal direction is located, and the light intensity continuously decreases from there toward the angular direction in which the end 182f at one side is located.

Therefore, if the first and second lighting operations are respectively executed in the first and second light source sections 12A and 12B, the position (XY coordinates) of the target object Ob can be detected in the same way as in the first embodiment. In this case, the sum of the driving currents supplied to the plurality of light emitting elements for emission of first detection light 128 is set as the first driving current value, and the sum of the driving currents supplied to the plurality of light emitting elements for emission of second detection light 129 is set as the second driving current value.

In addition, when detecting the angular position of the target object Ob in the Z-axis direction, all of the plurality of light emitting elements for emission of first detection light 128 are turned on and all of the plurality of light emitting elements for emission of second detection light 129 are turned off first in the third period (third lighting operation). In this case, the light emitting element for emission of first detection light 128 is driven without the help of the driving current balance adjusting circuit 780 described with reference to FIGS. 13A to 13C. Therefore, as shown by arrows indicating the level of the emission intensity in FIG. 15A, the emission intensity of the light emitting element for emission of first detection light 128 is constant from the side, at which the end 181f at one side of the first flexible substrate 181 in the longitudinal (circumferential) direction is located, toward the side, at which the end 181e at the other side of the first flexible substrate 181 is located. Accordingly, in the third light intensity distribution LID3 of the first detection light L2s emitted to the space to be detected 10R, the light intensity is constant from the angular direction, in which the end 181f at one side of the first flexible substrate 181 in the longitudinal direction is located, toward the angular direction, in which the end 181e at the other side is located.

On the other hand, in the fourth period, all of the plurality of light emitting elements for emission of second detection light 129 are turned on and all of the plurality of light emitting elements for emission of first detection light 128 are turned off (fourth lighting operation). In this case, the light emitting element for emission of second detection light 129 is driven without the help of the driving current balance adjusting circuit 780 described with reference to FIGS. 13A to 13C. Therefore, as shown by arrows indicating the level of the emission intensity in FIG. 15B, the emission intensity of the light emitting element for emission of second detection light 129 is constant from the side, at which the end 181f at one side of the first flexible substrate 181 in the longitudinal (circumferential) direction is located, toward the side, at which the end 181e at the other side of the first flexible substrate 181 is located. Accordingly, in the fourth light intensity distribution LID4 of the second detection light L2t emitted to the space to be detected 10R, the light intensity is constant from the angular direction, in which the end 181f at one side of the first flexible substrate 181 in the longitudinal direction is located, toward the angular direction, in which the end 181e at the other side is located.

Therefore, if the third and fourth lighting operations are respectively executed in the first and second light source sections 12A and 12B, the position of the target object Ob in the Z-axis direction can be detected in the same way as in the first embodiment. In this case, the sum of the driving currents supplied to the plurality of light emitting elements for emission of first detection light 128 is set as the third driving current value, and the sum of the driving currents supplied to the plurality of light emitting elements for emission of second detection light 129 is set as the fourth driving current value.

According to this configuration, it is possible to emit detection light (first detection light L2s and second detection light L2t) from the first and second light source modules 126 and 127 to positions far apart in the X-axis direction and the Y-axis direction. Accordingly, the space to be detected 10R in the X-axis direction and the Y-axis direction can be made wider.

Emission Angle Range of Detection Light in the Z-Axis Direction

Figure 16A:
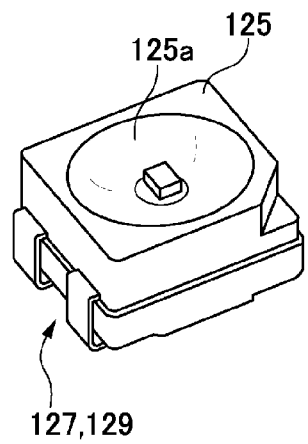
FIGS. 16A and 16B are explanatory views of a light emitting element used in the optical position detection device according to the second embodiment of the invention.
Figure 16A:
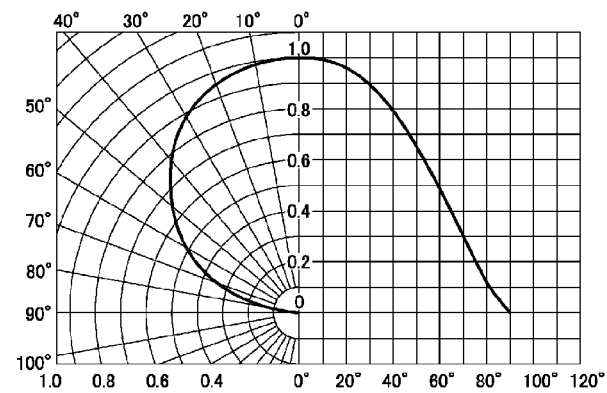
Figure 16B:
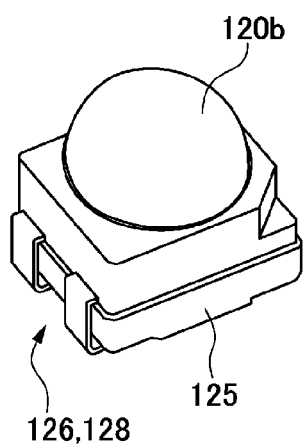
Figure 16B:
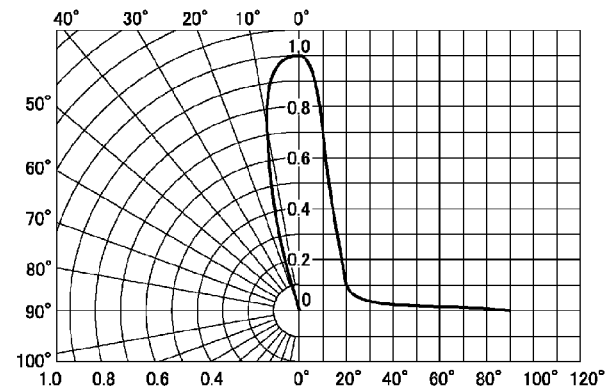

FIGS. 16A and 16B are explanatory views of the light emitting element 120 used in the optical position detection device 10 according to the second embodiment of the invention. FIG. 16A is an explanatory view of the light emitting element 120 used in the second light source module 127, and FIG. 16B is an explanatory view of the light emitting element 120 used in the first light source module 126.

As shown in FIG. 16A, in the light emitting element for emission of second detection light 129 used in the second light source module 127, a light emitting section 120a is located in a bottom portion of a recess 125a of a hemispherically recessed package 125. For this reason, in the light emitting element for emission of second detection light 129, the viewing angle is relatively large and the half-value angle is ±60°. On the other hand, as shown in FIG. 16B, in the light emitting element for emission of first detection light 128 used in the first light source module 126, a light emitting section 120a is located in a bottom portion of a recess 125a of a hemispherically recessed package 125, similar to the light emitting element shown in FIG. 16A. A lens 120b with a positive power is provided at the position overlapping the light emitting section 120a. For this reason, in the light emitting element for emission of first detection light 128, the viewing angle is smaller than that in the light emitting element for emission of second detection light 129, and the half-value angle is ±12°.

Accordingly, as shown in FIGS. 11B to 11D, the emission angle range θz1 of the first detection light L2s in the Z-axis direction which is emitted from the first light source module 126 is narrower than the emission angle range θz2 of the second detection light L2s in the Z-axis direction which is emitted from the second light source module 127. Therefore, the amount of overlap between the first detection light L2s and the second detection light L2t is small. Thus, according to the present embodiment, from the form shown in FIG. 11E, a change in the difference between the adjustment amounts when the target object Ob is displaced by the fixed distance in the Z-axis direction is large in the graph shown in FIG. 11A. Therefore, the position of the target object Ob in the Z-axis direction can be reliably detected.

Other Embodiments

Although two light source sections 12 are used in the embodiments described above, the position of the target object Ob may be detected using one light source section 12.
Example of the Configuration of a Position Detection System
First Specific Example of the Position Detection System 1

Figure 17:
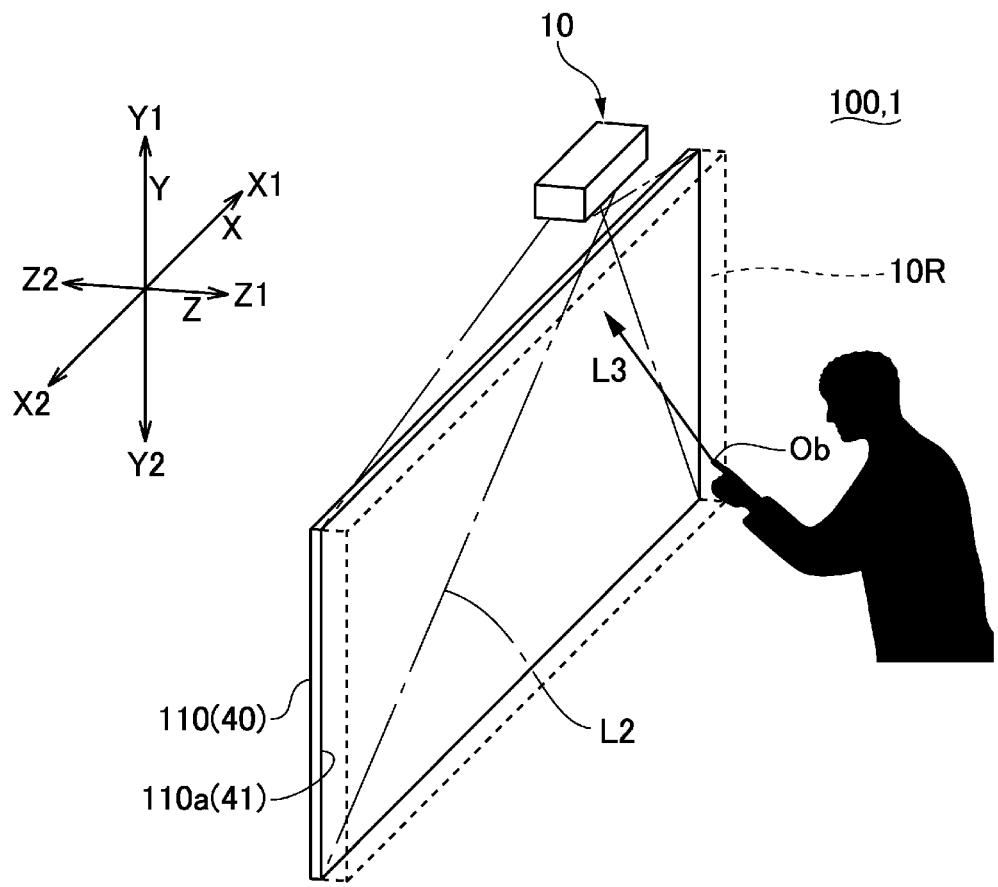
FIG. 17 is an explanatory view of a first specific example (a display system with an input function) of a position detection system to which the invention is applied.

FIG. 17 is an explanatory view of a first specific example (display system with an input function) of the position detection system 1 to which the invention is applied. In addition, in the display system with an input function according to the present embodiment, the configuration of the position detection system 1 and the optical position detection device 10 is the same as the configuration described with reference to FIGS. 1A to 16B. Accordingly, the same components are denoted by the same reference numerals, and a duplicate explanation thereof will be omitted.

In the position detection system 1 according to the embodiment described above, if a display device 110 is used as the viewing surface forming member 40 and the optical position detection device 10 described with reference to FIGS. 1A to 16B is provided in the display device 110 as shown in FIG. 17, it can be used as a display system with an input function 100, such as an electronic blackboard or a digital signage. Here, the display device 110 is a direct viewing type display device or a rear projection type display device having the viewing surface forming member 40 as a screen.

In the display system with an input function 100, the optical position detection device 10 emits the detection light L2 along a display surface 110a (viewing surface 41) and also detects the detection light L2 (reflected light L3) reflected from the target object Ob. Accordingly, since the position of the target object Ob can be detected if the target object Ob is brought close to a part of an image displayed on the display device 110, the position of the target object Ob can be used as input information, such as an image switching instruction.
Second Specific Example of the Position Detection System 1

Figure 18:
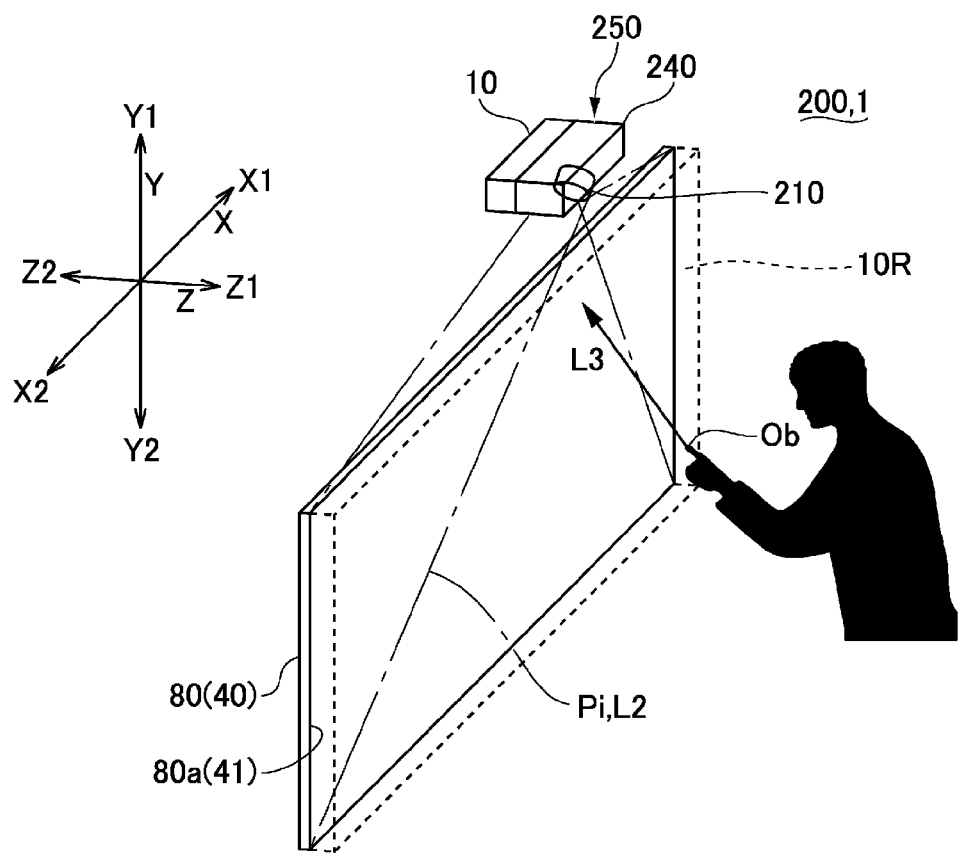
FIG. 18 is an explanatory view of a second specific example (a display system with an input function/projection type display system with an input function) of a position detection system to which the invention is applied.

Referring to FIG. 18, an example in which a projection type display system with a position function is formed using a screen as the viewing surface forming member 40 will be described. FIG. 18 is an explanatory view of a second specific example (display system with an input function/projection type display system with an input function) of the position detection system 1 to which the invention is applied. In addition, in the projection type display system with a position function according to the present embodiment, the configuration of the position detection system 1 and the optical position detection device 10 is the same as the configuration described with reference to FIGS. 1A to 16B. Accordingly, the same components are denoted by the same reference numerals, and a duplicate explanation thereof will be omitted.

In a projection type display system with an input function 200 (display system with an input function) shown in FIG. 18, an image is projected from an image projection apparatus 250 (image generator), such as an LCD projector or a digital micromirror device, onto a screen 80 (viewing surface forming member 40). In the projection type display system with an input function 200, the image projection apparatus 250 projects image display light Pi from a projector lens system 210, which is provided in a housing 240, toward the screen 80 in an enlarged manner. Here, the image projection apparatus 250 projects the image display light Pi toward the screen 80 from the direction slightly inclined from the Y-axis direction. Therefore, the viewing surface 41 through which the information is viewed is formed by a screen surface 80a of the screen 80 onto which an image is projected.

In the projection type display system with an input function 200, the optical position detection device 10 is added to the image projection apparatus 250 so that they are integrally formed. For this reason, the optical position detection device 10 emits the detection light L2 from a place, which is different from the projector lens system 210, along the screen surface 80a and also detects the reflected light L3 reflected from the target object Ob. Accordingly, since the position of the target object Ob can be detected if the target object Ob is brought close to a part of an image projected on the screen 80, the position of the target object Ob can be used as input information, such as an image switching instruction.

In addition, if the optical position detection device 10 and the screen 80 are unified, a screen apparatus with an input function can be formed.
Other Specific Examples of the Position Detection System 1

In the invention, it is possible to adopt a configuration in which the viewing surface forming member 40 is a light transmissive member that covers an exhibit. In this case, the viewing surface 41 is a surface, on which the exhibit is viewed, at the opposite side to the side where the exhibit is disposed in the light transmissive member. Through such a configuration, it is possible to form a window system with an input function or the like.

In addition, it is possible to adopt a configuration in which the viewing surface forming member 40 is a base that supports a mobile medium for games. In this case, the viewing surface 41 is a surface of the base located at the side where the relative position of the base and the medium for games is viewed. According to this configuration, amusement machines, such as a pachinko machine and a coin-operated game, can be formed as an amusement system with an input function and the like.

The entire disclosure of Japanese Patent Application No. 2011-082505 filed Apr. 4, 2011 is incorporated by reference herein.

What is claimed is:

1. An optical position detection device comprising:

a first light source module that includes a first light emitting section and radially emits first detection light along a virtual plane defined by first and second directions crossing each other, the first detection light having a light intensity which changes along a circumferential direction of the first light emitting section;

a second light source module that includes a second light emitting section and is provided at a position separated from the first light source module in a third direction crossing the virtual plane and that radially emits second detection light along the virtual plane, the second detection light having alight intensity which changes along a circumferential direction of the second light emitting section;

a light source driving section that drives the first and second light source modules in different periods;

a light receiving section that receives light from a target object located in a detection light emission space to which at least one of the first detection light and the second detection light is emitted; and a position detecting section that detects position information of the target object in the first, second, and third directions based on received light intensity of the light receiving section.

2. The optical position detection device according to claim 1, wherein an emission angle range of the first detection light in the third direction is narrower than an emission angle range of the second detection light in the third direction.

3. The optical position detection device according to claim 2, wherein the first light source module includes:
  a light emitting element that emits the first detection light,
  a first light guide that guides the first detection light emitted from the light emitting element so that the first detection light is emitted toward the detection light emission space, and
  an emission angle range limiting member provided on a light emitting surface of the first light guide to limit an emission angle range of the first detection light in the third direction, and the second light source module includes:
  a light emitting element that emits the second detection light, and
  a second light guide that guides the second detection light emitted from the light emitting element so that the second detection light is emitted toward the detection light emission space.

4. The optical position detection device according to claim 3, wherein the emission angle range limiting member is a louver film, and a louver portion of the louver film is inclined toward a side opposite to a side at which the second light source module is located in the third direction from a light incidence surface toward a light emitting surface of the louver film.

5. The optical position detection device according to claim 3, wherein the first light source module includes, as the light emitting element for emitting the first detection light:
  a first light emitting element which makes the first detection light incident on the first light guide from one end of the first light guide, and
  a second light emitting element which makes the first detection light incident on the first light guide from another end of the first light guide, the second light source module includes, as the light emitting element for emitting the second detection light:
  a third light emitting element which makes the second detection light incident on the second light guide from one end of the second light guide, and
  a fourth light emitting element which makes the second detection light incident on the second light guide from another end of the second light guide, and the light source driving section is adapted to turn on the first light emitting element during a first period, to turn on the fourth light emitting element during a second period, to turn on both the first and the second light emitting elements during a third period, and to turn on both the third and fourth light emitting elements during a fourth period.

6. The optical position detection device according to claim 2, wherein the first light source module includes a plurality of first light emitting elements for emitting the first detection light, the plurality of first light emitting elements being arranged in an array in a circumferential direction of the first light source module, the second light source module includes a plurality of second light emitting elements for emitting the second detection light, the plurality of second light emitting elements being arranged in an array in a circumferential direction of the second light source module, and the light source driving section is adapted to operate in a first period during which the plurality of first light emitting elements are turned on in a condition in which an emission intensity decreases from one end toward another end of a light guide, to operate in a second period during which the plurality of second light emitting elements are turned on in a condition in which an emission intensity decreases from the another end toward the one end, to operate in a third period during which the first light emitting elements are operated with the same emission intensity, and a fourth period during which the second light emitting elements are operated with the same emission intensity.

7. The optical position detection device according to claim 5, wherein the position detecting section detects a position of the target object in the first and second directions based on a comparison result of a received light intensity in the first period and a received light intensity in the second period in the light receiving section and detects the position of the target object in the third direction based on a comparison result of the received light intensity in the third period and the received light intensity in the fourth period in the light receiving section.

8. An optical position detection system comprising:

the optical position detection device according to claim 1, wherein a viewing surface forming member having a viewing surface extending along the virtual plane is disposed at a side of the first light source module with respect to the detection light emission space in the third direction.

9. A display system with an input function comprising:
a display device with a display surface on which an image is displayed; and
an optical position detection device that detects a position of a target object located at a surface side of the display device on which the image is displayed,
wherein the image is switched based on a position detection result of the target object in the optical position detection device, and
the optical position detection device includes:
- a first light source module that includes a first light emitting section and radially emits first detection light along a virtual plane defined by first and second directions crossing each other, the first detection light having a light intensity which changes along a circumferential direction of the first light emitting section;
- a second light source module that includes a second light emitting section and is provided at a position separated from the first light source module in a third direction crossing the virtual plane and that radially emits second detection light along the virtual plane, the second detection light having a light intensity which changes along a circumferential direction of the second light emitting section;
- a light source driving section that drives the first and second light source modules in different periods;
- a light receiving section that receives light from the target object located in a detection light emission space to which at least one of the first detection light and the second detection light is emitted; and
- a position detecting section that detects position information of the target object in the first, second, and third directions based on received light intensity of the light receiving section.

10. A display system with an input function comprising:
an image projection apparatus that projects an image; and
an optical position detection device that optically detects a position of a target object located at a side of the image projection apparatus toward which the image is projected,
wherein the image is switched based on a position detection result of the target object in the optical position detection device, and
the optical position detection device includes:
- a first light source module that includes a first light emitting section and radially emits first detection light along a virtual plane defined by first and second directions crossing each other, the first detection light having a light intensity which changes along a circumferential direction of the first light emitting section;
- a second light source module that includes a second light emitting section and is provided at a position separated from the first light source module in a third direction crossing the virtual plane and that radially emits second detection light along the virtual plane, the second detection light having a light intensity which changes along a circumferential direction of the second light emitting section;
- a light source driving section that drives the first and second light source modules in different periods;
- a light receiving section that receives light from the target object located in a detection light emission space to which at least one of the first detection light and the second detection light is emitted; and
- a position detecting section that detects position information of the target object in the first, second, and third directions based on received light intensity of the light receiving section.

* * * * *